(12) United States Patent
Battle et al.

(10) Patent No.: US 11,768,095 B2
(45) Date of Patent: Sep. 26, 2023

(54) MEASURED FLUID DISPENSER

(71) Applicant: AMS LLC, Canton, OH (US)

(72) Inventors: Matthew Battle, Canton, OH (US); Adrian Bischoff, Chapel Hill, NC (US)

(73) Assignee: AMS, LLC, Cleveland, OH (US)

( * ) Notice: Subject to any disclaimer, the term of this patent is extended or adjusted under 35 U.S.C. 154(b) by 0 days.

(21) Appl. No.: 17/716,175

(22) Filed: Apr. 8, 2022

(65) Prior Publication Data

US 2022/0236095 A1 Jul. 28, 2022

Related U.S. Application Data

(63) Continuation-in-part of application No. 17/063,104, filed on Oct. 5, 2020, now Pat. No. 11,365,999.

(60) Provisional application No. 62/911,608, filed on Oct. 7, 2019, provisional application No. 63/174,252, filed on Apr. 13, 2021, provisional application No. 63/257,615, filed on Oct. 20, 2021.

(51) Int. Cl.
| | |
|---|---|
| *G01F 11/00* | (2006.01) |
| *G01F 11/28* | (2006.01) |
| *G01F 11/26* | (2006.01) |
| *G01F 19/00* | (2006.01) |

(52) U.S. Cl.
CPC ......... *G01F 11/288* (2013.01); *G01F 11/006* (2013.01); *G01F 11/263* (2013.01); *G01F 11/268* (2013.01); *G01F 19/00* (2013.01)

(58) Field of Classification Search
CPC .... G01F 11/288; G01F 11/263; G01F 11/006; G01F 19/00; G01F 11/268
See application file for complete search history.

(56) References Cited

U.S. PATENT DOCUMENTS

| | | | |
|---|---|---|---|
| 3,128,919 A | 4/1964 | Baxter | |
| 3,141,579 A | 7/1964 | Medlock | |
| 4,226,341 A | 10/1980 | Towns et al. | |
| 4,463,876 A | 8/1984 | Swallert | |
| 4,941,598 A * | 7/1990 | Lambelet, Jr. .......... | G01F 11/02 |
| | | | 222/321.6 |

(Continued)

FOREIGN PATENT DOCUMENTS

| | | |
|---|---|---|
| WO | 2019013427 A1 | 1/2019 |
| WO | 2019199801 | 10/2019 |
| WO | 2020091984 A1 | 5/2020 |

OTHER PUBLICATIONS

U.S. Appl. No. 17/063,104, filed Oct. 5, 2020.

(Continued)

*Primary Examiner* — Frederick C Nicolas
(74) *Attorney, Agent, or Firm* — Renner, Otto, Boisselle & Sklar, LLP

(57) ABSTRACT

A measured fluid dispenser for dispensing fluid from a storage container includes a measurement chamber, a fluid flow passage fluidly connecting the measurement chamber with the storage container, and a valve that is movable between an open position in which the fluid flow passage is opened to permit fluid flow from the storage chamber to the measurement chamber, and a closed position in which the fluid flow passage is closed to prevent fluid flow between the measurement chamber and the storage chamber. The measurement chamber may be adjustable to vary a fillable volume of the measurement chamber to thereby preselect an amount of fluid to be dispensed.

19 Claims, 16 Drawing Sheets

(56) References Cited

U.S. PATENT DOCUMENTS

| | | | |
|---|---|---|---|
| 4,961,521 A | 10/1990 | Eckman | |
| 5,031,802 A * | 7/1991 | Joulia | G01F 11/08 |
| | | | 222/207 |
| 5,259,536 A | 11/1993 | Reyman | |
| 5,280,846 A | 1/1994 | Lonnecker | |
| 5,292,039 A | 3/1994 | Neofitou | |
| 5,363,991 A | 11/1994 | Reyman | |
| 5,381,930 A * | 1/1995 | Kalabakas | G01F 11/286 |
| | | | 222/205 |
| 5,542,579 A | 8/1996 | Robbins, III | |
| 5,549,224 A * | 8/1996 | Wu | G01F 11/263 |
| | | | 222/207 |
| 5,584,420 A * | 12/1996 | Awada | G01F 11/263 |
| | | | 222/525 |
| 5,810,203 A * | 9/1998 | Brennan | B05B 11/1032 |
| | | | 222/207 |
| 5,839,619 A | 11/1998 | Willer | |
| 5,967,377 A * | 10/1999 | Glynn | B65D 41/26 |
| | | | 222/320 |
| 6,877,639 B1 | 4/2005 | Hanson | |
| 7,748,579 B1 | 7/2010 | Shin | |
| 7,850,043 B2 | 12/2010 | Foster | |
| 8,657,159 B2 | 2/2014 | Nielsen | |
| 10,058,484 B2 | 8/2018 | Battle | |
| 11,365,999 B2 * | 6/2022 | Battle | G01F 11/268 |
| 11,448,542 B2 * | 9/2022 | Valavala | B65D 41/26 |
| 2016/0243003 A1 | 8/2016 | Battle | |
| 2021/0102827 A1* | 4/2021 | Battle | G01F 11/263 |
| 2021/0389166 A1* | 12/2021 | Valavala | G01F 11/268 |

OTHER PUBLICATIONS

International Search Report and Written Opinion dated Jul. 8, 2022 in corresponding International Application No. PCT/US2022/023975.

* cited by examiner

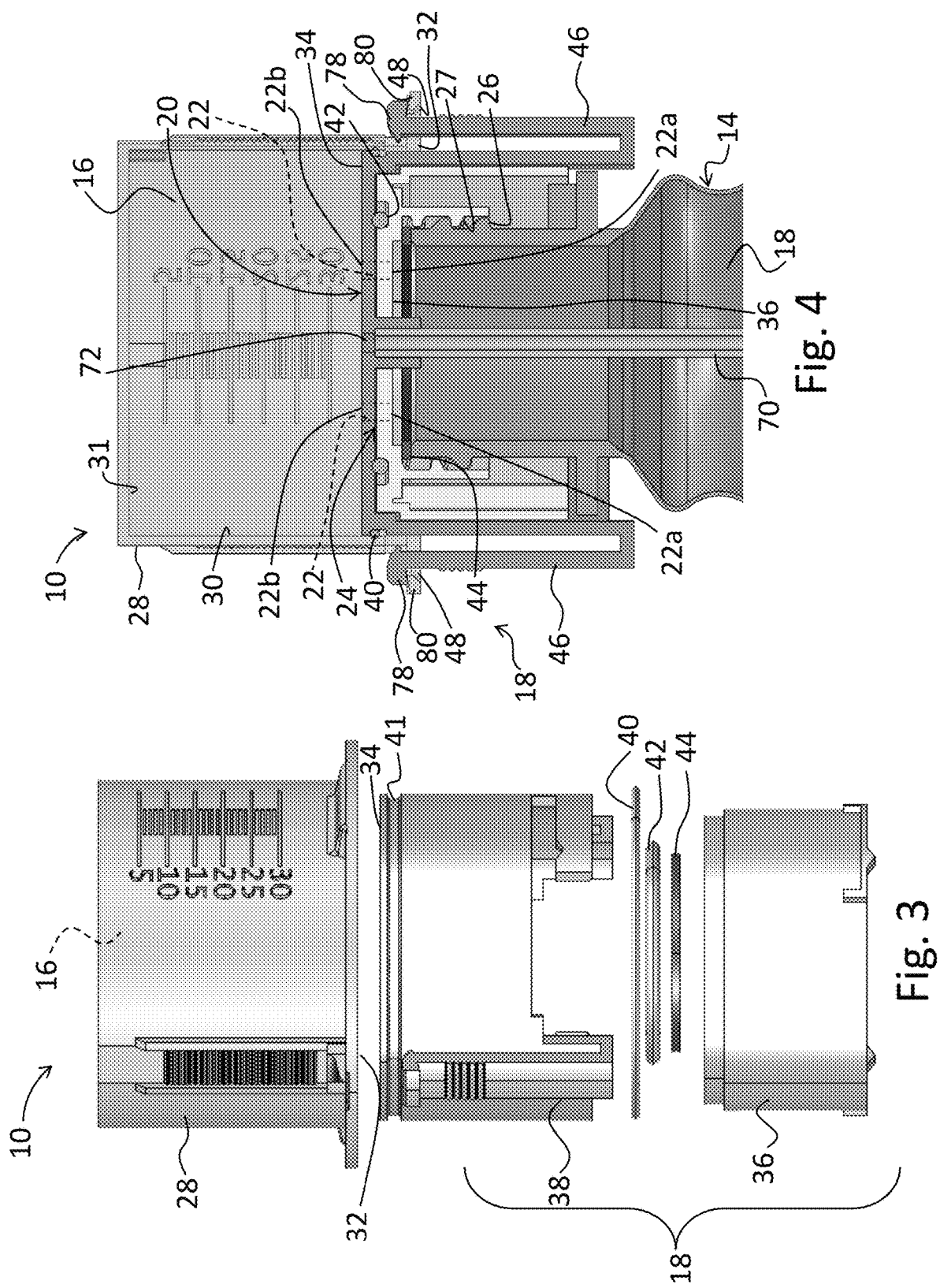

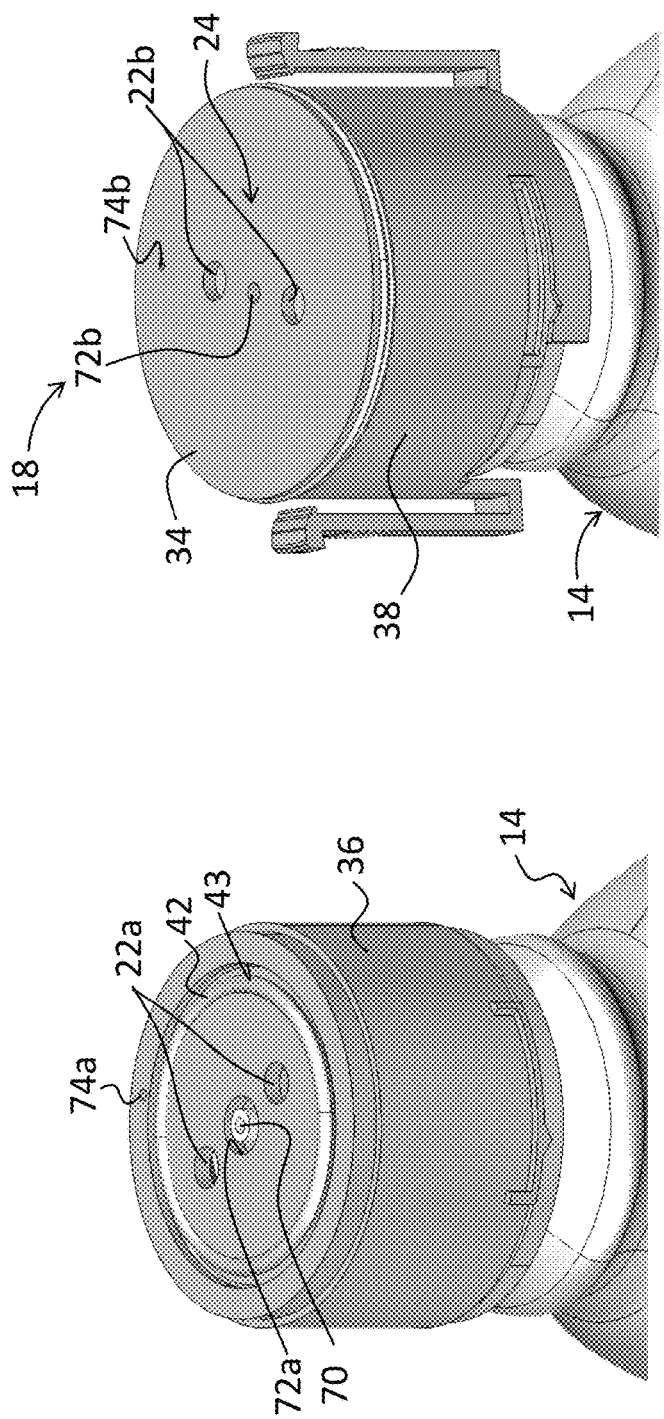
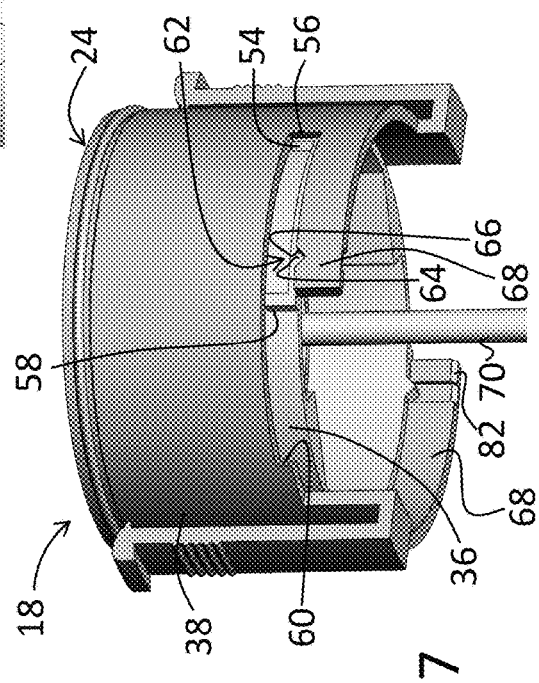

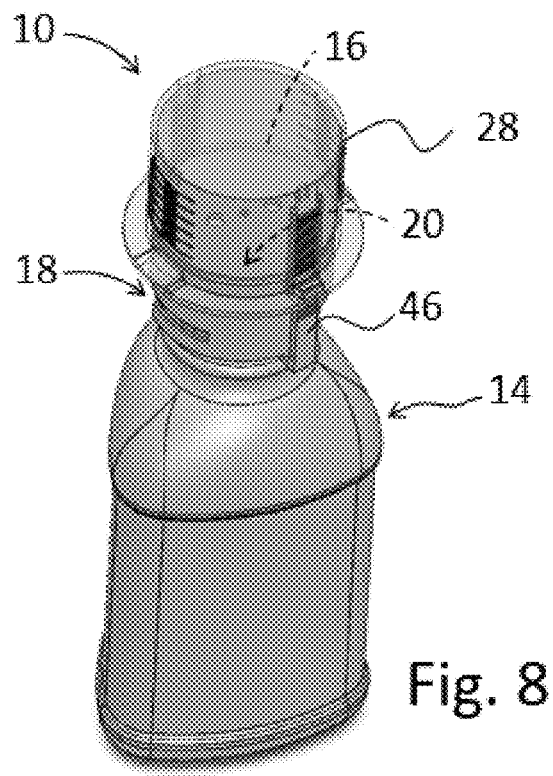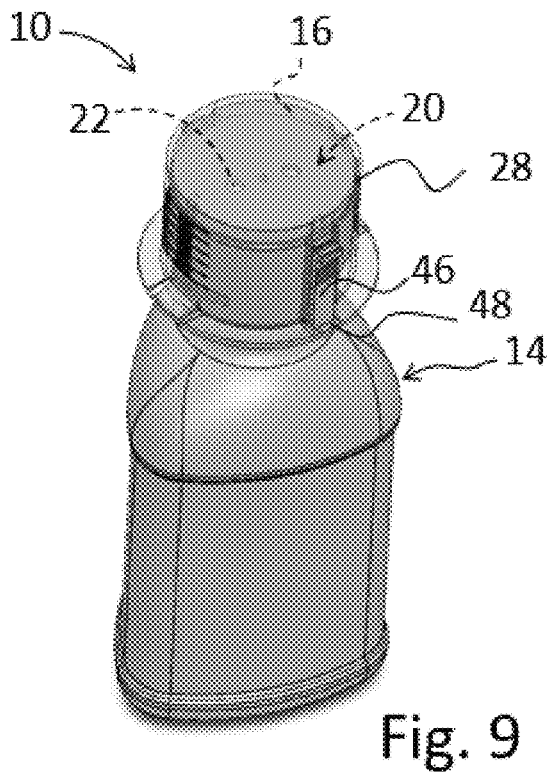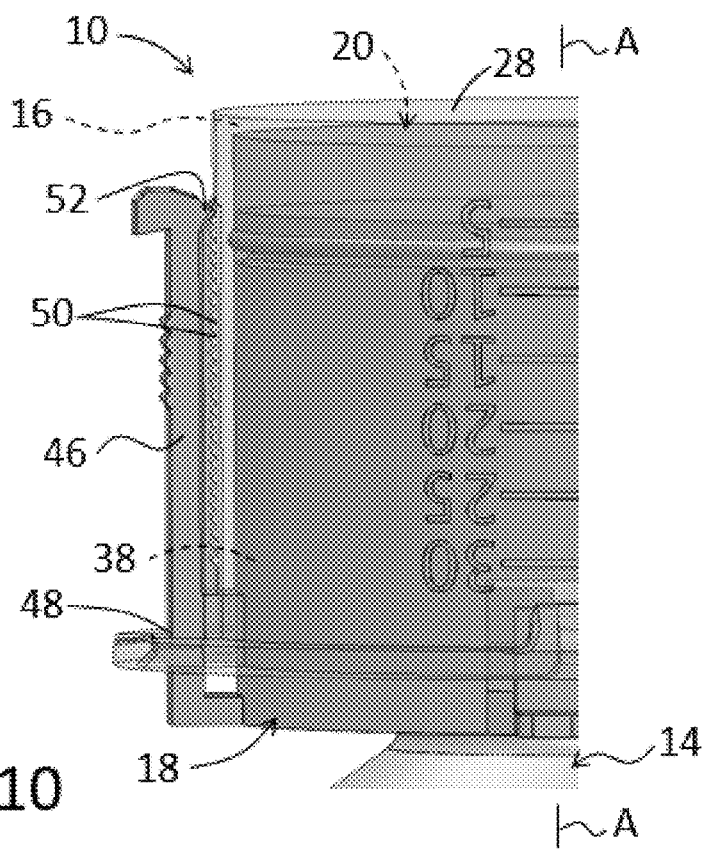

MEASURED FLUID DISPENSER

RELATED APPLICATIONS

This application is a continuation-in-part of U.S. Nonprovisional application Ser. No. 17/063,104 filed Oct. 5, 2020, which claims the benefit of U.S. Provisional Application No. 62/911,608 filed Oct. 7, 2019. This application also claims the benefit of U.S. Provisional Application No. 63/174,252 filed on Apr. 13, 2021, and U.S. Provisional Application No. 63/257,615 filed on Oct. 20, 2021. All of the foregoing applications are hereby incorporated herein by reference in their entireties.

TECHNICAL FIELD

The present disclosure relates generally to fluid dispensers, and more particularly to a fluid dispenser for measuring and dispensing fluid contained in a container.

BACKGROUND

There exist many ways to measure fluid from a container. One such conventional way is by using a measuring cup including delineated markers along the side of the cup to visually indicate to a user how much fluid is contained therein and dispensed from a bottle. The delineations on measuring cups are often very small and integrally formed into the plastic, which may cause some users difficulty in visually seeing the demarcations on the cup, and which could result in an improper dosage of medicine, for example.

SUMMARY

According to at least one aspect of the present disclosure, a fluid dispenser is provided that is configured to measure and dispense a prescribed quantity of fluid from a container with improved accuracy and ease.

For example, according to an aspect, a fluid dispenser is provided that enables a user to selectively adjust a fillable volume of a fluid chamber of the dispenser for dispensing the preselected quantity of fluid.

According to another aspect, an adjustable measured fluid dispenser for dispensing fluid from a storage chamber of a storage container includes: a measurement chamber; at least one fluid flow passage configured to fluidly connect the measurement chamber with the storage chamber; at least one valve that is movable between a first position in which the at least one fluid flow passage is opened to permit fluid flow from the storage chamber to the measurement chamber, and a second position in which the at least one fluid flow passage is closed to prevent fluid flow between the measurement chamber and the storage chamber; wherein a fillable volume of the measurement chamber is adjustable to adjust an amount of fluid to be contained in the measurement chamber.

According to another aspect, a measured fluid dispenser for dispensing fluid from a storage chamber of a storage container includes: a measurement chamber; a fluid flow passage configured to fluidly connect the measurement chamber with the storage chamber; a valve that is movable between an open position in which the fluid flow passage is opened to permit fluid flow from the storage chamber to the measurement chamber, and a closed position in which the fluid flow passage is closed to prevent fluid flow between the measurement chamber and the storage chamber; wherein the valve is a rotating valve in which a first valve part includes a first portion of the fluid flow passage that is in fluid communication with the storage chamber, and in which a second valve part includes a second portion of the fluid flow passage that is in fluid communication with the measurement chamber; wherein the second valve part is rotatable relative to the first valve part, and/or wherein the first valve part is rotatable relative to the second valve part; wherein, when in the closed position, the first valve part and the second valve part are oriented relative to each other such that the first portion of the at least one fluid flow passage is misaligned with the second portion of the at least fluid flow passage; and wherein, when in an open position, the first valve part and the second part are oriented relative to each other such that the first portion of the at least one fluid flow passage is aligned with the second portion of the at least fluid flow passage.

According to another aspect, an adjustable measured fluid dispenser for dispensing fluid from a storage chamber of a storage container includes: a measurement chamber of a measurement container having a fillable volume; a divider configured to separate the measurement chamber from the storage chamber of the container; at least one fluid flow passage extending through the divider and being configured to fluidly connect the measurement chamber with the storage chamber of the container; at least one check valve configured to open the at least one fluid flow passage and permit fluid flow from the storage chamber to the measurement chamber, and configured to close the at least one fluid flow passage to prevent fluid flow between the measurement chamber and the storage chamber, the at least one check valve being configured to open at a predefined cracking pressure; and wherein the fillable volume of the measurement chamber is adjustable to adjust an amount of fluid to be contained in the measurement chamber.

According to another aspect, a measured fluid dispenser for dispensing fluid from a storage chamber of a storage container includes: a measurement chamber of a measurement container having a fillable volume; a cap operably couplable to the container, the cap at least partially forming a divider configured to separate the measurement chamber from the storage chamber of the container; a first flow passage and a second flow passage, each extending through the divider and being configured to fluidly connect the measurement chamber with the storage chamber of the container; a first check valve configured to open the first flow passage and permit liquid to flow in one direction from the storage chamber to the measurement chamber, and configured to close the first flow passage to prevent liquid flow between the measurement chamber and the storage chamber; a second check valve configured to open the second flow passage and permit air to flow in one direction from the measurement chamber to the storage chamber, and configured to close the second flow passage to prevent fluid flow between the measurement chamber and the storage chamber; wherein the first check valve is configured to open at a first predefined cracking pressure to permit liquid to flow through the first flow passage from the storage chamber of the container into the measurement chamber, and the second check valve is configured to open at a second predefined cracking pressure to permit air in the measurement chamber that is displaced by the liquid to escape from the measurement chamber into the storage chamber of the container; and wherein the second cracking pressure is lower than the first cracking pressure.

According to another aspect, an adjustable measured fluid dispenser for dispensing fluid from a storage chamber of a storage container includes: a measurement chamber of a measurement container having a fillable volume; a cap operably couplable to the container, the cap at least partially forming a divider configured to separate the measurement chamber from the storage chamber of the container, the measurement container being fluidly sealed to the cap with at least one seal; at least one fluid flow passage extending through the divider and being configured to fluidly connect the measurement chamber with the storage chamber of the container; and at least one valve configured to open the at least one fluid flow passage and permit fluid flow from the storage chamber to the measurement chamber, and configured to close the at least one fluid flow passage to prevent fluid flow between the measurement chamber and the storage chamber; the cap having one or more axially extending guide slots that slidably receive and guide corresponding one or more radially inwardly extending guide protrusions on an inner portion of the measurement container, such that the measurement container is slidably movable axially upwardly and downwardly relative to the cap to adjust the fillable volume of the measurement chamber, and one or more detents arranged at an interface between the cap and measurement container that are configured to indicate discrete graduated fillable volumes of the measurement chamber.

According to another aspect, a method of dispensing fluid from a measured fluid dispenser includes: adjusting the measurement chamber to a desired amount of fluid to be contained in the measurement chamber; turning the measured fluid dispenser upside-down; squeezing the storage container of the adjustable fluid dispenser until the measurement chamber is filled; and dispensing the fluid from the measurement container. The dispensing may include removing the filled measurement chamber from the adjustable fluid measured dispenser while the container is upside-down, or may include opening a closure of the measurement container to dispense the fluid.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention.

FIG. 3 is an enlarged exploded side view of the fluid dispenser shown in FIG. 1.

FIG. 4 is a cross-sectional side view of the fluid dispenser.

FIG. 5 is a top perspective view of a portion of the fluid dispenser with the exemplary outer intermediate part and the exemplary measurement container removed.

FIG. 6 is a top perspective view of a portion of the fluid dispenser with the exemplary outer intermediate part shown and with the exemplary measurement container removed.

FIG. 7 is a bottom perspective view of an exemplary intermediate part of the fluid dispenser without the container and with the exemplary measurement container removed.

FIG. 8 is a top perspective view of the fluid dispenser and container shown with the exemplary measurement container adjusted to maximize the fillable volume of the measurement chamber.

FIG. 9 is a top perspective view of the fluid dispenser and container shown with the exemplary measurement container adjusted to minimize the fillable volume of the measurement chamber.

FIG. 10 is an enlarged side view of a portion of the fluid dispenser shown in FIG. 9.

DETAILED DESCRIPTION

Figure 1:
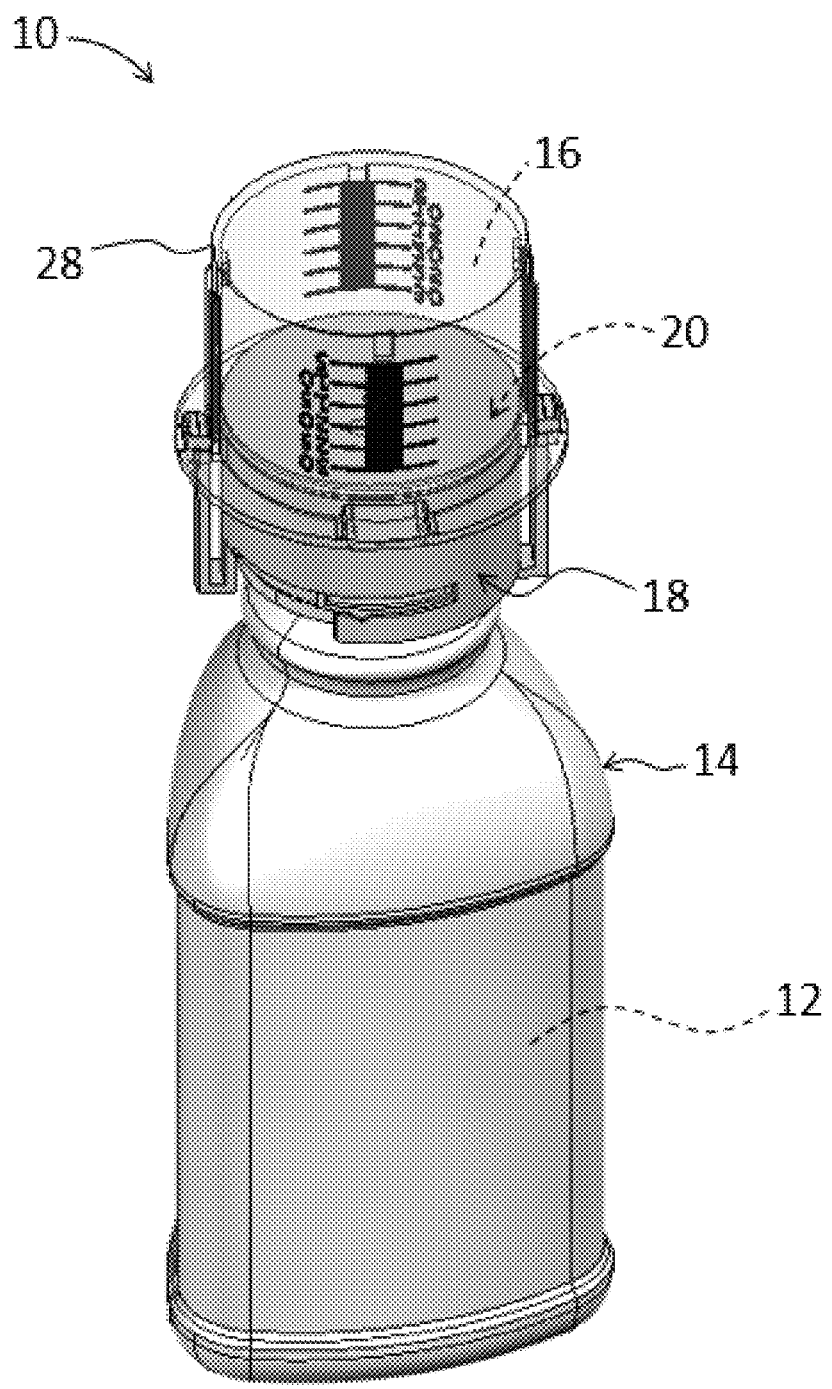
FIG. 1 is a perspective top view of an exemplary fluid dispenser and a container according to an embodiment of the present disclosure.
Figure 2:
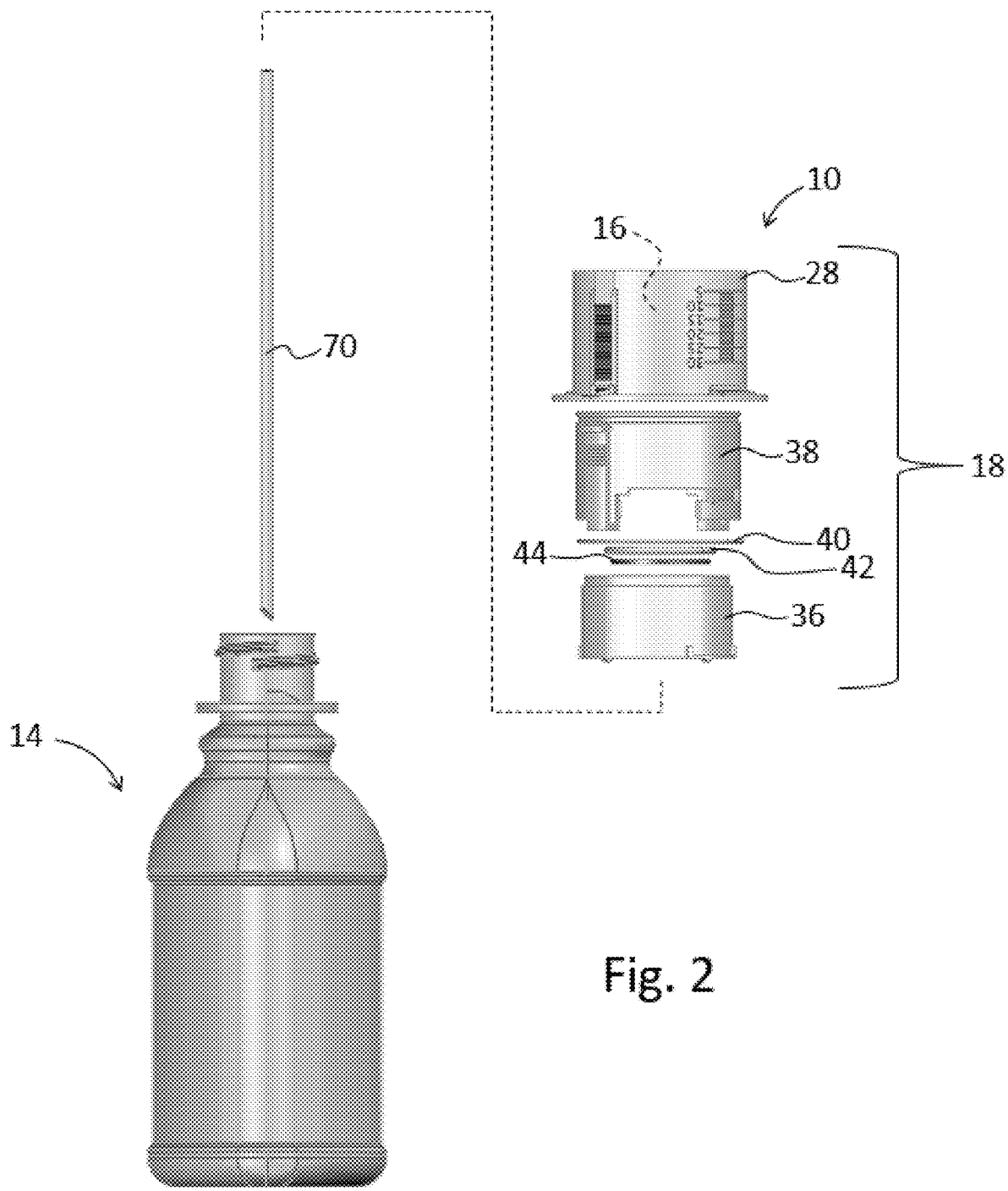
FIG. 2 is an exploded side view of the fluid dispenser and container shown in FIG. 1.

The principles and aspects of the present disclosure have particular application to fluid dispensers for use with liquid medications, and thus will be described below chiefly in this context. It is understood, however, that the principles and aspects of the present disclosure may be applicable for other applications for other types of fluids where it is desirable to measure and dispense a preselected quantity of fluid from a container with improved accuracy and ease.

FIGS. 1-12 show an exemplary fluid dispenser 10, or components thereof, for measuring and dispensing fluid contained in a chamber 12 of a storage container 14. As shown, the fluid dispenser 10 generally includes at least one internal measurement chamber 16 that defines a volume for measuring a preselected quantity of fluid. In exemplary embodiments, the dispenser 10 also includes an intermediate part 18, or portion, at least some of which forms a divider 20 that fluidly separates the storage chamber 12 from the measurement chamber 16. In the illustrated embodiment, at least one fluid flow passage 22 extends through the divider 18, and at least one suitable valve 24 is provided which is operative to open or close the fluid flow passage(s) 22 to thereby permit or restrict fluid flow between the storage chamber 12 and the measurement chamber 16, as described in further detail below.

The storage container 14 may be any suitable container or vessel, such as a bottle or the like, that is adapted to store a fluid, such as liquid medicine or the like. The storage container 14 may be made of a rigid or semi-rigid plastic that is difficult to squeeze by hand; or the storage container 14 may be made of flexible plastic that is easy to deform and squeeze by hand. In exemplary embodiments, the storage container 14 may be separate and discrete from the dispenser 10, in which case the dispenser 10 may be operably couplable to, and removable from, the storage container 14. In the illustrated embodiment, for example, the dispenser 10 is threadedly coupled to the storage container 14 via suitable threads, such as outer threads 26 of the storage container 14 and inner threads 27 of the dispenser 10. Alternatively, at least a portion of the dispenser 10, such as a portion of the intermediate part 18, may be integral and unitary with the storage container 14.

The internal measurement chamber 16 is formed by a measurement container 28 of the dispenser 10, which may be any suitable container or vessel adapted to receive and contain a preselected quantity of fluid from the storage chamber 12 of the storage container 14. The measurement container 28 and the measurement chamber 16 may have any suitable shape or form as may be desired for the particular application. In exemplary embodiments, the measurement container 28 is removably securable to the intermediate part 18 of the dispenser 10 to form a cap or other closure for enclosing the fillable volume of the measurement chamber 16. Alternatively, the measurement container 28 may be fixedly secured or coupled to the intermediate portion 18, and may include a spout, opening, or other dispensing device for enabling fluid to be dispensed therefrom.

In exemplary embodiments, the measurement chamber 16 is adjustable to vary the fillable volume of space within the measurement chamber 16. In this manner, a user may measure and dispense a desired volume of fluid simply by pre-selectively adjusting the fillable volume of the measurement chamber 16 either before or during filling of the chamber with the fluid from the storage chamber 12 of the storage container 14. The ability to adjust the fillable volume of the measurement chamber 16 in this way provides several advantages, such as greater number of discrete graduated volumes to choose from as the measurement chamber 16 is adjusted. In alternative embodiments, however, the measurement chamber 16 may be fixed in place to form one or more fixed volumes of space. For example, the measurement chamber 16 may be divided into two or more sub-chambers via divider wall(s), in which the sub-chambers may have different volumes of space. In such an alternative embodiment, the user may preselect a desired fixed volume via any suitable action, such as by operably activating one or more valves via one or more flow paths to thereby fill the selected fixed volume of space.

In exemplary embodiments, the measurement container 28 is formed as a dispensing cup, such as a cylindrical cup, having enclosed internal side(s) 30 and an enclosed internal bottom 31 (or top when viewed in FIG. 3 or 4) that forms respective internal bounds of the fillable volume of the measurement chamber 16. The measurement container 28, or cup, forming the measurement chamber 16 may have an open top 32 (or bottom when viewed in FIG. 3 or 4) that cooperates with the divider 20 and/or other portions of the intermediate part 18 to define the fillable volume of empty space in the measurement chamber 16. For example, as shown in the illustrated embodiment, an upper surface 34 of the divider 20 facing the inside of the measurement chamber 16 may be received into the opening 32 of the measurement container 28 to thereby form an upper (or lower) bound of the fillable volume of the measurement chamber 16. As shown, the divider 20 includes at least a portion of the fluid flow passage(s) 22 that fluidly connect the storage chamber 12 with the measurement chamber 16. One or more inlets 22a (e.g., inlet ports) and outlets 22b (e.g., outlet ports) of the flow passage(s) 22 open through the divider 20 to enable flow in at least one direction from the storage chamber 12 to the measurement chamber 16.

In the illustrated embodiment, the measurement chamber 16 is adjustable via adjustment of the measurement container 28 relative to other portions of the dispenser 10 to vary the fillable volume of space. The adjustment of the fillable volume of the measurement chamber 16 may be achieved in any suitable manner as would be understood by those having ordinary skill in the art. For example, the fillable volume of the measurement chamber 16 generally may be adjusted via a change in the spacing between one or more of the internal surfaces 30, 31 of the measurement container 28 relative to the one or more outlets 22b of the fluid flow passage(s) 22. In the illustrated embodiment, for example, the measurement container 28 (e.g., cup or cap) is axially movable relative to the intermediate part 18 such that a spacing between the bottom internal surface 31 of the measurement container 28 and the fluid outlet(s) 22b can be adjusted thereby varying the fillable volume of the measurement chamber 16. The operation of adjusting and removing the measurement container 28 shown in the illustrated embodiment will be described in further detail below.

The intermediate part 18 of the dispenser 10 generally is interposed between the storage chamber 14 and the measurement chamber 16 to form the divider 20 (e.g., divider wall(s) or other dividing surface(s)) that fluidly separates the chambers 14, 16. In exemplary embodiments, the intermediate part 18 is an intermediate assembly that is formed of multiple components. For example, as shown in the illustrated embodiment, the intermediate part 18 is formed as an intermediate assembly including an internal (or lower) intermediate part 36 that operably couples to the storage container 14, and an outer (or upper) intermediate part 38 that operably couples to the measurement container 28. The outer (or upper) intermediate part 38 forms the upper portion of the divider 20, and the inner (or lower) intermediate part 36 forms the lower portion of the divider. It is understood, however, that in alternative embodiments the intermediate part 18 may be a single part and/or may be formed integrally with the storage container 14 and/or the measurement container 28.

The intermediate part 18 includes the one or more fluid flow passages 22 that establish fluid communication between the storage chamber 12 and the measurement chamber 14. As such, the intermediate part also includes the respective inlet(s) 22a and outlet(s) 22b that correspond with the flow passages 22. The fluid flow passages 22, inlets 22a, and outlets 22b may be provided in any suitable form, such as being integrally formed through the divider 20 of the intermediate part 18, or being formed via separate pipes or conduits, for example. Any suitable number of fluid flow passages 22 may be provided in any suitable direction or combination of directions. In the illustrated embodiment, the dispenser 10 includes two fluid flow passages 22 that each extend axially with one side opening through the upper surface 34 of the outer intermediate part 38, and with an opposite side of each passage 22 opening through a lower surface 35 of the inner intermediate part 36. In exemplary embodiments, the full extent of the fluid flow passage(s) 22 between the respective inlet(s) 22a and outlet(s) 22b may be formed by aligning the openings in each of the inner and outer intermediate parts 36, 38, as described in further detail below.

To provide sealing functionality between the container chamber 14 and measurement chamber 16, the intermediate part 18 also may include one or more suitable seals. In the illustrated embodiment, for example, an O-ring seal 40 is disposed in a radial groove 41 of the intermediate part 18 to sealing engage with the inner side surface 30 of the measurement container 28. Also as shown, the intermediate part 18 includes an O-ring seal 42 disposed in a circumferential groove 43 in an upper surface of the inner (or lower) intermediate part 36 for sealingly engaging a space between the outer and inner intermediate parts 36, 38. In addition, the dispenser 10 may include a seal 44 between the inner intermediate part 36 and the storage container 14 for sealing a space therebetween.

As noted above, the dispenser 10 includes at least one suitable valve 24 that is operative to open the fluid flow passage(s) 22 to thereby permit fluid flow in at least one direction from the storage chamber 12 to the measurement chamber 16, and to close the fluid flow passage(s) 22 to thereby restrict fluid flow between the storage chamber 12 and the measurement chamber 16. The one or more valves 24 (also referred to herein as the valve 24 for simplicity) may be any suitable type of valve and may be located at any suitable location for providing such flow control functionality. The one or more valves 24 may be the same for each flow passage 22, or the valves 24 may be different in each flow passage 22. In exemplary embodiments, the valve 24 is actuatable by the user to actively open and actively close the valve 24. Alternatively, the valve 24 may be actuatable by fluid pressure or spring pressure to provide opening and/or closing of the valve 24. Exemplary types of valves that are suitable for use in the dispenser 10 include, but are not limited to, a check valve, a shut off valve, a flow control valve, or the like; such as a spring-operated ball check valve, a duck-bill check valve, a U-cup check valve or other lip check valve, a rotating disc valve, a spool valve, a gate valve, or any other suitable type of valve.

In the illustrated embodiment, the valve 24 is a rotating valve 24, such as a rotating disc or rotating plate valve. The rotating valve 24 may include a first valve part that is rotatable relative to a second valve part to open or close the fluid flow passage(s) 22. As shown in the illustrated embodiment, the respective parts of the rotating valve 24 are formed by the divider disc or plate portions of the outer intermediate part 38 and inner intermediate part 36 being movable relative to each other. As noted above, these respective portions of the divider 20 formed by the inner and outer intermediate parts 36, 38 each include respective openings, or apertures, that define respective portions of the fluid flow passage(s) 22. As best shown in FIGS. 5 and 6, the openings in the inner (or lower) intermediate part 26 are indicated with reference numeral 22a (corresponding with inlets 22a) for simplicity, and the openings in the outer (or upper) intermediate part 28 are indicated with reference numeral 22b (corresponding with outlets 22b) for simplicity. As will be described in further detail below, the valve 24 is actuatable to open via movement of the respective inner or outer intermediate parts 36, 38 to align the respective openings 22a, 22b with each other to open the fluid passage(s) 22, and the valve 24 is actuatable to close via movement of the intermediate parts 36, 38 to misalign the respective openings 22a, 22b to close the fluid passage(s) 22.

An exemplary operation of the dispenser 10 will now be described. Referring initially to FIGS. 8-10, the measurement container 28 is secured to the intermediate part 18 of the dispenser, and a user may adjust the fillable volume of the measurement chamber 16 by moving the measurement container 28 along axis A relative to the intermediate part 18. As shown in the comparison between FIG. 8 and FIG. 9, such axial movement causes the distance from the bottom internal surface 31 of the measurement container 28 to the upper surface 34 of the intermediate part 18 to increase or decrease to respectively increase or decrease the fillable volume of the measurement chamber 16. In exemplary embodiments, the measurement container 28 is slidably movable relative to the intermediate part 18 while maintaining sealing engagement with the seal 40. It is understood that such slidable movement to adjust the fillable volume of the measurement chamber 16 is exemplary, and other suitable forms of movement may be provided, such as threaded rotational and axial movement of the measurement container 28 relative to the intermediate part 18, for example. However, such slidable movement may provide certain advantages in ease of adjustment, accuracy of adjustment, and manufacturability of the dispenser 10, for example.

As shown, to facilitate slidable movement of the measurement container 28, the intermediate part 18 may include one or more axial guides 46, such as rails, that cooperate with one or more respective guide slots 48 in the measurement container 28. The cooperation of the guides 46 with the guide slots 48 also constrains rotational movement of the measurement container 28 with the outer intermediate part 38. This can help to enable opening and closing of the rotating valve 24 (described in further detail below) by co-rotating the measurement container 28 with the outer intermediate part 38.

To facilitate accurate adjustment of the fillable volume of the measurement chamber 16, the measurement container 28 and/or guides 46 may include a series of detents 50 or other catch mechanism indicating discrete intervals of the fillable volume in the measurement chamber 16. In the illustrated embodiment, for example, an outer surface of the measurement container 28 includes a series of axially spaced apart ridges and grooves (e.g., teeth, also referenced with 50) that cooperate with a hook 52, or pin, on the guide 46 to indicate each axial adjustment of a predefined amount. The guide 46 in the illustrated embodiment includes a flexure, or flexible finger element, that enables movement of the hook 52 in an out of the series of teeth 50. In exemplary embodiments, each detent 50 (e.g., tooth) corresponds with a fillable volume increase or decrease of an amount in the range between 1 mL to 5 mL, for example. In the illustrated embodiment, each detent 50 corresponds to a 1 mL increase or decrease of the fillable volume of fluid. This enables the user to easily preselect the fillable volume of the measurement chamber 16 to measure and dispense the desired amount of fluid. In exemplary embodiments, the total fillable volume of fluid in the measurement chamber 16 may be in the range from 5 mL to 30 mL, for example.

Figure 11:
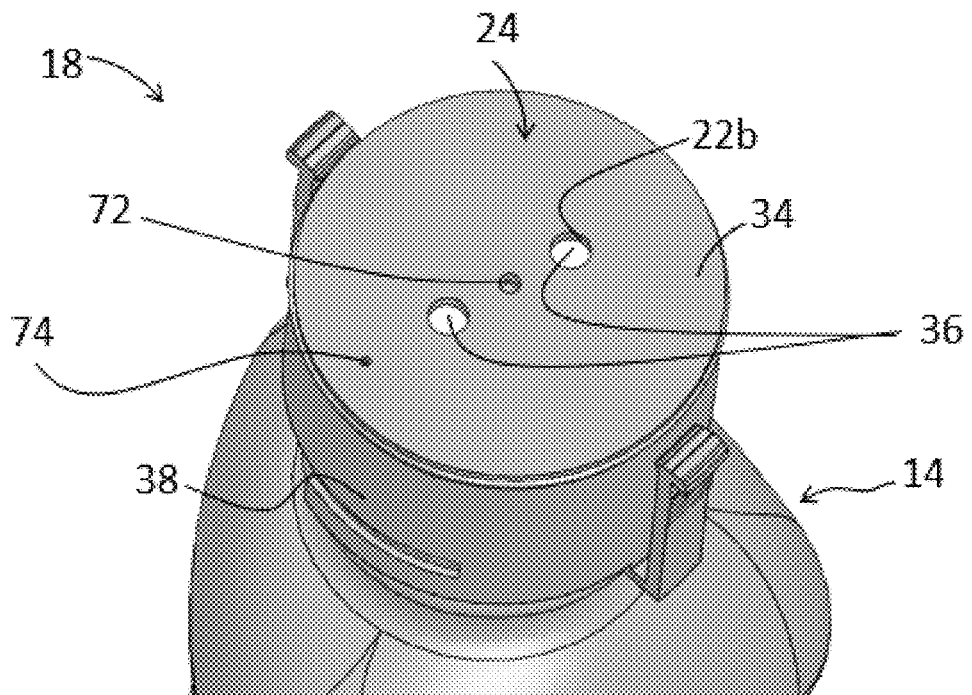
FIG. 11 is a top perspective view of a portion of the fluid dispenser shown without the measurement container, and which shows an exemplary valve in a closed state.
Figure 12:
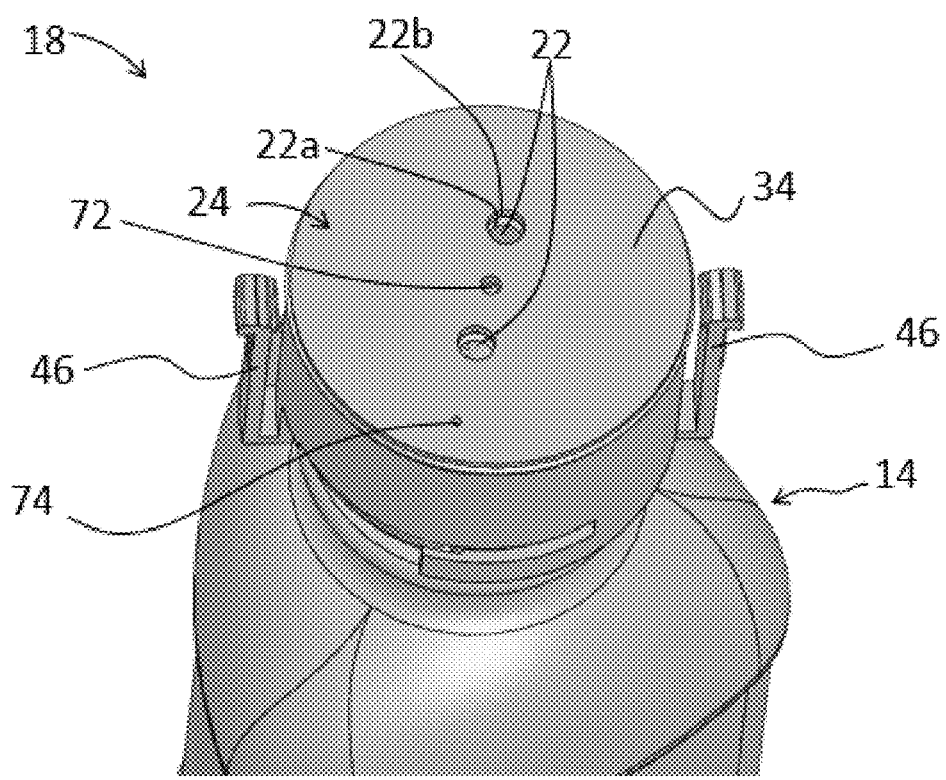
FIG. 12 is a top perspective view of a portion of the fluid dispenser shown without the measurement container, and which shows the exemplary valve in an open state.
Figure 13:
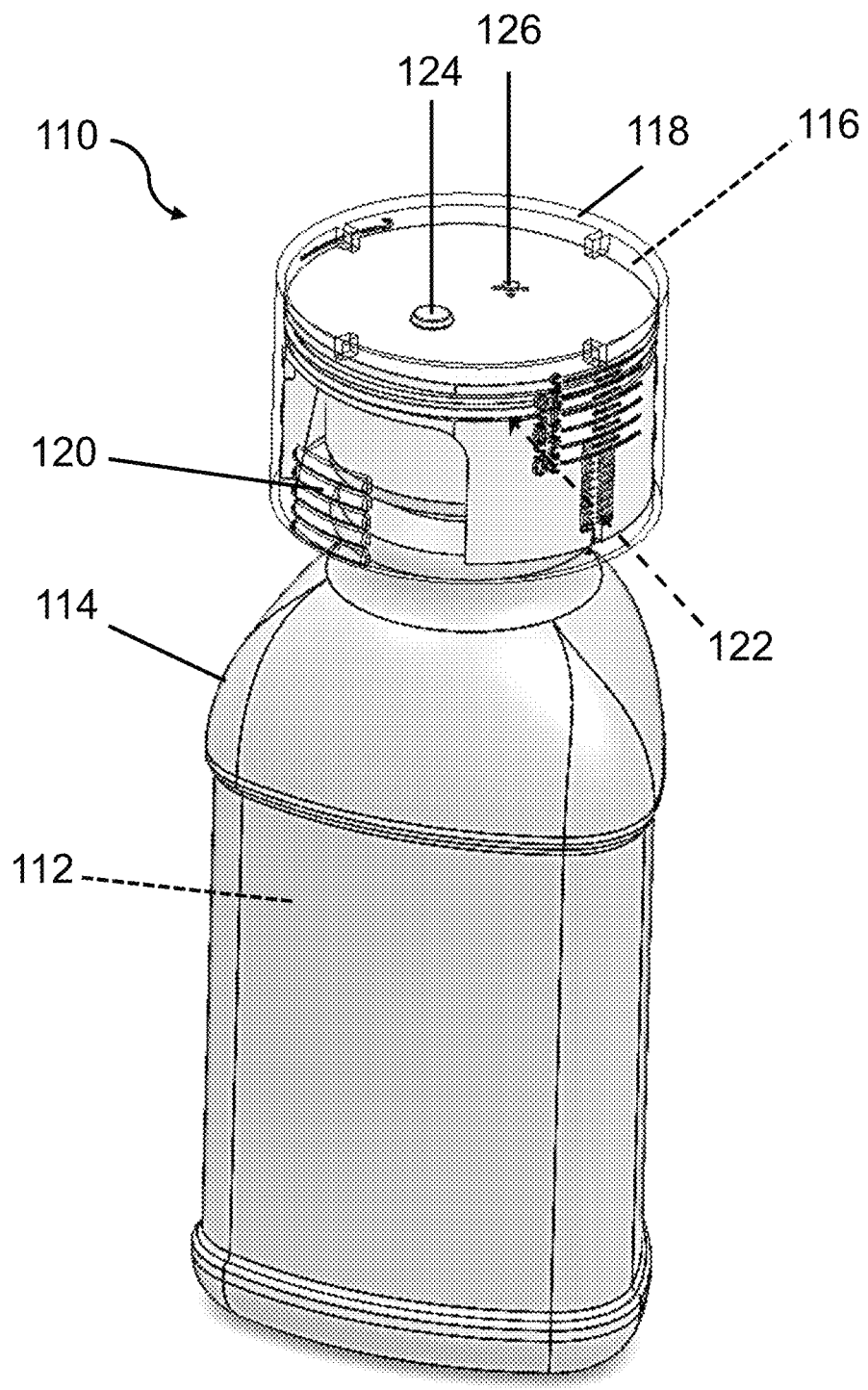
FIG. 13 is a top, right, front perspective view of another exemplary measured fluid dispenser and container according to another embodiment of the present disclosure.
Figure 14:
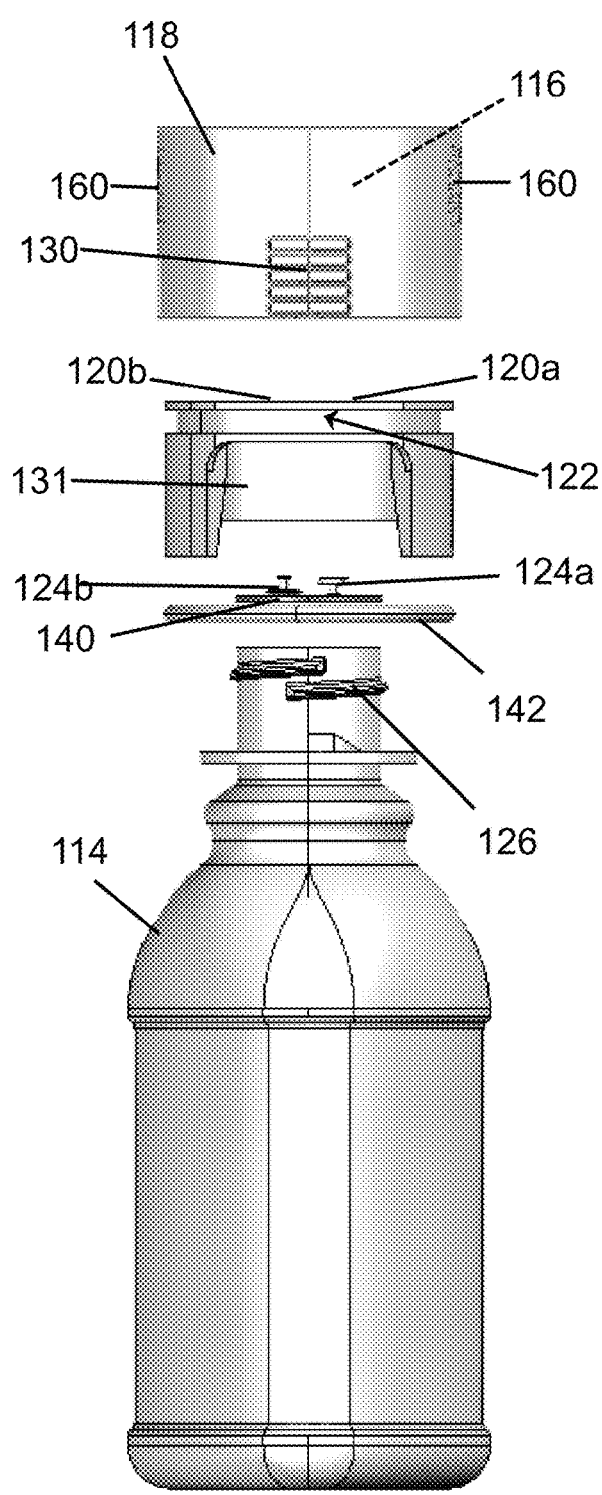
FIG. 14 is front exploded view of the fluid dispenser in FIG. 13.
Figure 15:
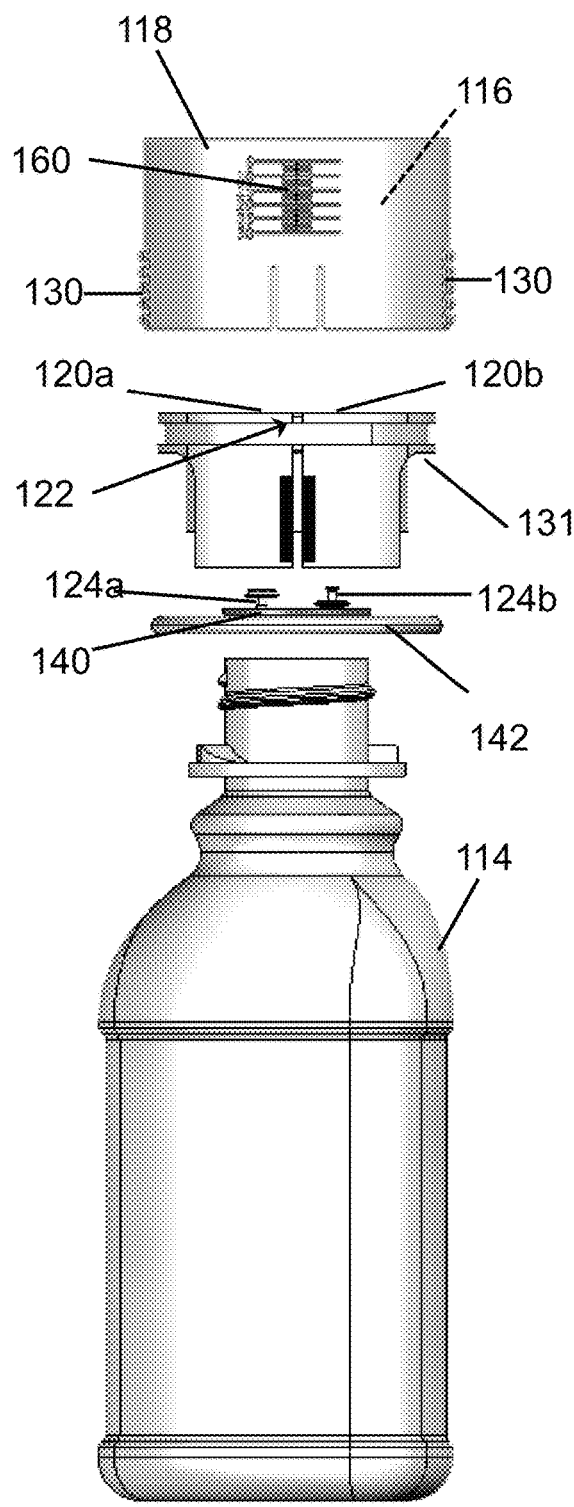
FIG. 15 is a right side exploded view of the fluid dispenser in FIG. 13.

Referring now particularly to FIGS. 11 and 12, actuation of the valve 24 to open or close the fluid flow passage(s) 22 will now be described. Before or after turning the storage container 14 upside down to fill the measurement container 16, the valve 24 is actuated open by the user. As discussed above, the valve 24 in the illustrated embodiment is a rotating valve formed by respective divider portions of the outer (or upper) intermediate part 38 and inner (or lower) intermediate part 36 cooperating with each other through alignment or misalignment of the respective openings 22*a*, 22*b* to respectively open or close the valve 24. Accordingly, to actuate the valve 24 to open (as shown in FIG. 12), the user rotates the outer intermediate part 38 by a predefined amount (e.g., 45-degrees) relative to the stationary inner intermediate part 36 to align the openings 22*a*, 22*b* in each of the inner and outer intermediate parts 36, 38 to thereby open the flow passage 22 between the storage chamber 12 and the measurement chamber 16. Because the measurement container 28 is fixed relative to the outer intermediate part 38 via the guides 46 interlocking with guide slots 48, the user may actuate the valve 24 by applying rotational torque to the measurement container 28 which rotates the valve 24.

To enhance user interaction with actuating the valve 24, the valve 24 may include one or more stops for indicating the fully opened and fully closed positions. For example, referring particularly to FIG. 7, the illustrated embodiment shows the inner intermediate part 36 having a first radially protruding rib 54 that is configured to engage a first stop surface 56 of the outer intermediate part 38 when the valve 24 is rotated to its fully-closed position (FIG. 11). The inner intermediate part 36 also includes a second radially protruding rib 58 that is circumferentially offset from the first radially protruding rib 54 that is configured to engage a second stop surface 60 of the outer intermediate part 38 when the valve is rotated to its fully-open position (FIG. 12).

Also to enhance user interaction with actuating the valve 24 and ensuring that the valve is closed to prevent leakage, the valve 24 may include one or more locking features for locking the valve in the closed position. For example, still referring to FIG. 7, an exemplary locking mechanism 62 is shown for locking the valve 24 in the closed position (e.g., when the openings 22*a*, 22*b* are rotationally misaligned). As shown, the locking mechanism 62 may be formed by an interlocking interface between the inner intermediate part 36 and the outer intermediate part 38 when the valve 24 is closed. The interlocking interface may include a detent or catch. In the illustrated embodiment, for example, the interlocking interface is formed by an axially extending protrusion 64 of the inner intermediate part 36 having at least one inclined surface that interfaces against a corresponding inclined surface of an axially extending notch 66, or groove, in a portion of the outer intermediate part 38 when the valve 24 is in its closed position. The portion of the outer intermediate part 38 having the notch 66 which interacts with the protrusion 64 is formed as a circumferentially extending rim or collar portion 68 that is resilient and applies an axial biasing force to bias the protrusion 64 into the notch 66.

When the user rotates the valve 24 from closed toward open, the user applies sufficient rotational force that is exerted against the inclined interlocking interface and causes the collar portion 68 to flex downward when the biasing force from the collar portion is overcome. When the protrusion 64 clears the notch 66, the valve 24 is free to rotate to the open position, which serves as an indication to the user that the valve 24 is unlocked. When the user rotates the valve 24 from the open position to the closed position, the opposite inclined surface of the protrusion 64 interfaces against the collar portion 68 to urge the collar portion downwardly, and when the protrusion 64 reaches the notch 66 the collar portion 68 snaps into interlocking engagement to lock the valve 24 in the closed position. In this manner, the locking mechanism 62 provides a resilient snap together locking mechanism. In the illustrated embodiment, two such locking mechanisms 62 are provided, which are offset 180-degrees from each other about the intermediate part 18. It is understood that the valve 24 may include fewer or greater such locking mechanisms 62, or even a different type of locking mechanism. It also is understood that although the inner intermediate part 36 is shown having the protrusion 64 and the outer intermediate part 38 has the notch 66, these could be reversed for one or more of the locking mechanisms 62.

Because the measurement chamber 16 is fluidly sealed, to facilitate fluid flow from the storage chamber 12 to the measurement container 16 when the valve is opened and the storage container 14 is flipped upside down, the dispenser 10 may include one or more pressure equalization features. In the illustrated embodiment, for example, the dispenser 10 includes a pressure equalization tube 70 that enables the air pocket in the measurement chamber 16 to fluidly communicate with the air space at the top (when upside down) of the storage chamber 12. As shown in FIGS. 5 and 6, for example, the tube 70 may be inserted through or fluidly coupled to openings 72*a*, 72*b* (collectively referred to as 72) in the respective divider portions of the inner and outer intermediate parts 36, 38. This allows the air in the measurement chamber 16 to be purged to the storage chamber 12 so that the entire preselected fillable volume of the measurement chamber 16 may be filled, thereby ensuring an accurate preselected dose.

Also because the measurement chamber 16 is fluidly sealed, the dispenser 10 may include one or more vent features to facilitate adjustment of the measurement chamber 16. For example, to facilitate adjustment of the fillable volume of the measurement chamber 16 without the buildup of suction or pressure, the dispenser 10 includes one or more vent passages 74 that fluidly communicate air in the measurement chamber 16 with the air in the storage chamber 12 when the measurement container 28 is adjusted up or down. In exemplary embodiments, the vent passage(s) 74 cooperate with the valve 24, such that when the valve 24 is actuated to its closed position, the vent passage(s) 74 are opened, and when the valve 24 is actuated to its opened position, the vent passage(s) 74 are closed. In the illustrated embodiment, the vent passage(s) 74 are formed via small vent apertures 74*a*, 74*b* (FIGS. 5 and 6) in each of the divider portions of the inner and outer intermediate parts 36, 38 that align with each other when opened and are misaligned when closed, similarly to the openings 22*a*, 22*b* for fluid flow passages 22. In exemplary embodiments, the vent passage(s) 74 are sized sufficiently large enough to allow airflow therethrough, but are sized sufficiently small to prevent or restrict fluid flow (e.g., based on viscosity) when the valve 24 is closed.

When the measurement chamber 16 has been completely filled with fluid to the preselected volume, the user may then actuate the valve 24 to its closed position, thereby preventing leakage from the storage container 14 when the measurement container 28 (e.g., cap) is removed.

With the storage container 14 still turned upside down and the valve 24 closed, the user may remove the measurement container 28 from the dispenser 10. In the illustrated embodiment, as shown in FIG. 4, the guides 38 include hooks 78 at their ends (e.g., lower ends when upside down) that engage respective catches or lips 80 on the measurement container 28 that prevents the measurement container 28 from being accidentally removed. To remove the measurement container 28, the user squeezes the flexible guides 46 toward each other, releasing the hooks 78 from the lips 80. The measurement container 28 can then be removed.

The lock/release mechanism provided by the hook-and-lip interface of the flexible guides 46 and measurement container 28 may serve as a first childproof feature of the dispenser 10. The dispenser 10 also may include one or more additional childproof features. For example, the flexible collar portions 68 of the outer intermediate part 38 each may include a boss 82 that axially constrains the inner and outer intermediate parts 36, 38 together so that they are prevented from accidentally being disassembled from each other. In addition, between the inner intermediate part 36 and the storage container 14, there may be a squeeze-and-turn safety mechanism to prevent accidental removal of the intermediate part 18 from the storage container 14.

Turning now to FIGS. 13-25, another exemplary embodiment of a measured fluid dispenser 110 is shown. The fluid dispenser 110 is similar to the above-referenced fluid dispenser 10, and thus the foregoing description of the dispenser 10 may be equally applicable to the fluid dispenser 110 except as noted below. Moreover, it is understood that that aspects of the fluid dispensers 10, 110 may be substituted for one another or used in conjunction with one another where applicable.

As shown, the fluid dispenser 110 generally includes at least one internal measurement chamber 116 that defines a fillable volume for measuring a preselected quantity of fluid. The dispenser 110 also includes a divider 122 that fluidly separates a storage chamber 112 of a container 114 from the measurement chamber 116. At least one fluid flow passage 120 extends through the divider 122, and at least one suitable valve 124 is provided which is operative to open or close the fluid flow passage(s) 120 to thereby permit or restrict fluid flow between the storage chamber 112 and the measurement chamber 116.

The storage container 114 may be any suitable container or vessel, such as a bottle or the like, that is adapted to store a fluid, such as liquid medicine or the like. The storage container 114 may be made of flexible plastic that is easy to deform and squeeze by hand. In exemplary embodiments, the storage container 114 may be separate and discrete from the dispenser 110, in which case the dispenser 110 may be operably couplable to, and removable from, the storage container 114. In the illustrated embodiment, for example, the dispenser 110 is threadedly coupled to the storage container 114 via suitable threads, such as outer threads 126 of the storage container 114 and inner threads 127 of the dispenser 110. In exemplary embodiments, the dispenser 110 is coupled to the container 114 with an intermediate part that forms at least a portion of the divider 122. The intermediate part (also referenced with 122) may thus form a closure for the opening in the container 114, such as being a cap, plug or other the like. Alternatively, at least a portion of the dispenser 110, such as a portion of an intermediate part forming at least a portion of the divider 122, may be integral and unitary with the storage container 114.

As shown, the measurement chamber 116 is at least partially formed by internal surfaces of a measurement container 118 of the dispenser 110. The measurement container 118 may be any suitable container or vessel adapted to receive and contain a preselected quantity of fluid from the storage chamber 112 of the storage container 114. The measurement container 118 and the measurement chamber 116 may have any suitable shape or form as may be desired for the particular application. In exemplary embodiments, the measurement container 118 is removably securable to, and removable from, the intermediate part with divider 122 and/or the container 114. For example, the measurement container 118 may in the form of a removable dispensing cup, such as a cylindrical cup with open top. Alternatively or additionally, the measurement container 118 may have a cap, lid or other closure that is openable for opening a spout or other opening of the measurement container 118 for dispensing fluid from the measurement chamber 116.

To provide sealing functionality between the container chamber 114 and measurement chamber 116, the divider or intermediate part 122 may include one or more suitable seals. In the illustrated embodiment, for example, a gasket or O-ring seal 140 is disposed in a groove of the intermediate part 122 to sealing engage with a portion of the container 114, such as an upper edge of the container spout, for example. In addition, to seal the measurement chamber 116 from the external environment and prevent leakage, the divider or intermediate part 122 also may include a suitable seal, such as a U-cup seal or O-ring seal 142 disposed in a groove of the intermediate part 122 (shown as a U-cup in FIG. 16 and an O-ring in FIG. 19). The O-ring may provide for a simpler construction, and the U-cup seal may be self-pressurizable to enhance sealing when fluid is in the measurement container 116 or so that it has less friction during adjustment of the measurement container 118 (described below).

As noted above, the dispenser 110 includes at least one suitable valve 124 that is operative to open the fluid flow passage(s) 120 to thereby permit fluid flow in at least one direction from the storage chamber 112 to the measurement chamber 116, and to close the fluid flow passage(s) 122 to thereby restrict fluid flow between the storage chamber 112 and the measurement chamber 116. The one or more valves 124 may be any suitable type of valve and may be located at any suitable location for providing such flow control functionality. The one or more valves 124 may be the same for each flow passage 122, or the valves 124 may be different in each flow passage 122. In exemplary embodiments, the valve 124 is self-actuatable by fluid pressure to provide opening and/or closing of the valve 124. Alternatively, the valve 124 may be actuatable by a user or with the assistance of spring pressure to provide opening and/or closing of the valve 124.

In the illustrated embodiment, the one or more valves 124 include one or more one-way check valves 124. The check valves 124 may be any suitable type of check valve, such as umbrella valves, swing check valves, lift check valves, stop-check valves, or the like. In exemplary embodiments, the check valve(s) 124 is a one-piece elastomeric valve, such as an umbrella valve, duckbill valve, U-cup valve, or similar type lip check valve. As shown in the illustrated embodiment, for example, two valves 124a and 124b are provided, each of which is in the form of an umbrella valve. The umbrella valves are elastomeric one-way, one-piece valves that have a diaphragm shaped sealing disk, which seals against the divider 122 in the illustrated embodiment to prevent backflow, and which can separate from the divider 122 to provide flow in one-direction. The convex diaphragm of the umbrella valve flattens out against the valve seat (divider 122) and absorbs a certain amount of seat irregularities and creates a certain sealing force. Like other check valves, the umbrella valve has a predefined cracking pressure, which is the input pressure level at which the flow is present, and can be described as a measure of the pressure differential between the input and output sides of the check valve when flow is initially present. With respect to the umbrella valve, it will allow forward flow when the fluid pressure at the input side generates enough force to lift the diaphragm from the seat so that it will permits flow at a predetermined pressure in one way and prevents backflow in the opposite way. Such a valve provides a simplified design of the assembly and makes the valve adaptable to minimal space, reduces the number of pieces in a valve, and simplifies assembly. Moreover, because of the sealability against the divider 112 the umbrella valve may provide a better seal.

As shown, the exemplary fluid dispenser 110 includes at least two check valves 124a and 124b respectively disposed in at least two fluid passages 120a, 120b, and which are provided for different functions. The first check valve 124a is arranged such that its input side is exposed to fluid pressure from the storage chamber 112 and its output side is exposed to fluid pressure in the measurement chamber 116, and so the first check valve 124a is configured to permit fluid (e.g., liquid) to flow in one direction through the first fluid flow passage 120a from the storage chamber 112 into the measurement chamber 116 when the check valve 124a is opened at its predefined cracking pressure. The second check valve 124b (also referred to as an air bleed valve) is arranged oppositely with its input side is exposed to fluid pressure from the measurement chamber 116 and its output side exposed to fluid pressure in the storage chamber 112 so as to permit fluid (e.g., air) to flow in one direction through the second fluid flow passage 120b from the measurement chamber 116 into the storage chamber 112 when the check valve 124b is opened at its predefined cracking pressure.

Because of the differences in the function of the check valves 124a, 124b and flow passages 120a, 120b, the check valves (e.g., respective cracking pressures) and the flow passages (e.g., size of flow passages) may be configured differently from each other. For example, the first and second check valves 124a, 124b may be respectively configured such that the first cracking pressure is different from the second cracking pressure, so that the first and second check valves are activated to open or close at different times when the dispenser is in use. For example, the second check valve 124b serving as an air bleed valve may have a lower predefined cracking pressure than the cracking pressure of the first check valve 124a, which may permit the second check valve 124b (air bleed) to remain open longer than the first check valve 124a. Likewise, the second (air bleed) passage 120b may be sized smaller than the first (liquid flow) passage 120a, for example.

Figure 16:
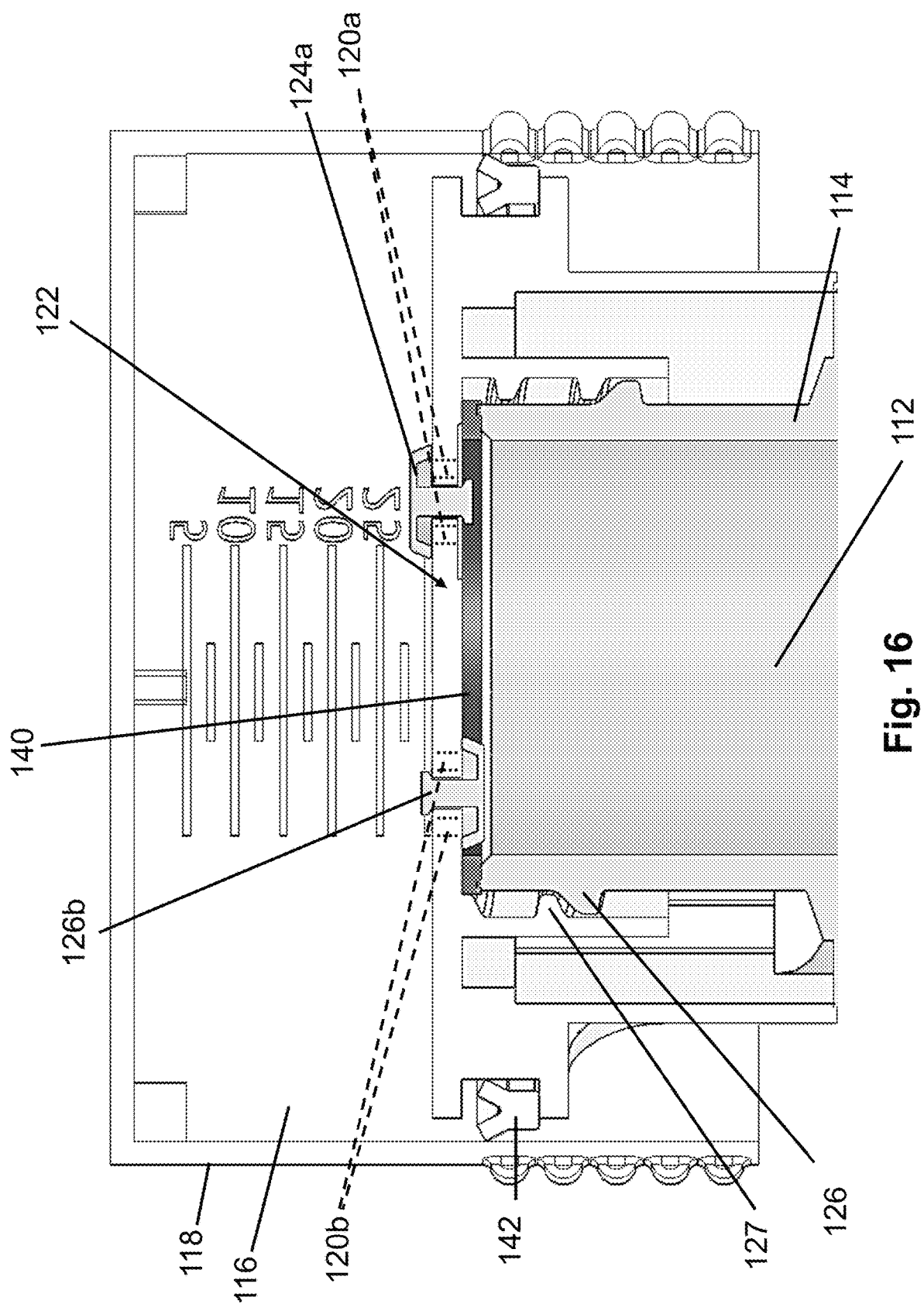
FIG. 16 is a cross-sectional side view of the fluid dispenser in FIG. 13 in an initial state showing two valves both in their closed states.
Figure 17:
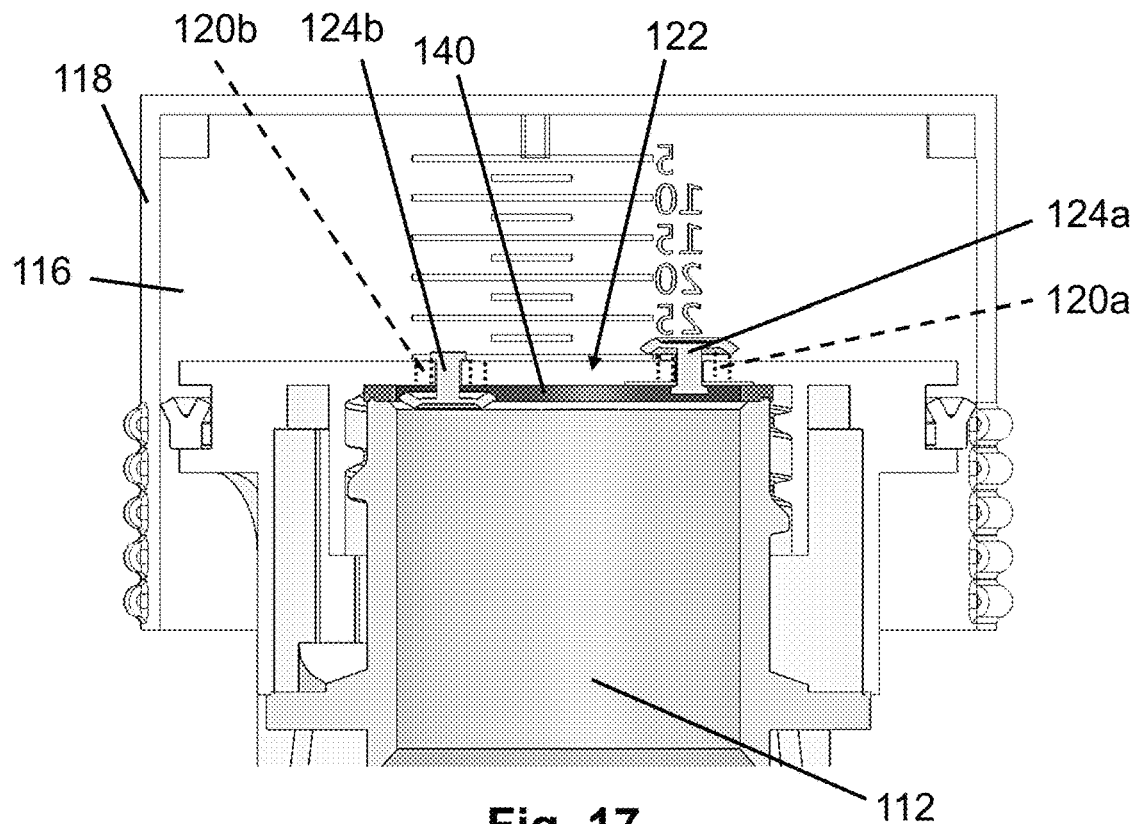
FIG. 17 is a cross-sectional side view of the fluid dispenser in FIG. 13 in a filling state showing both valves in their open states.
Figure 18:
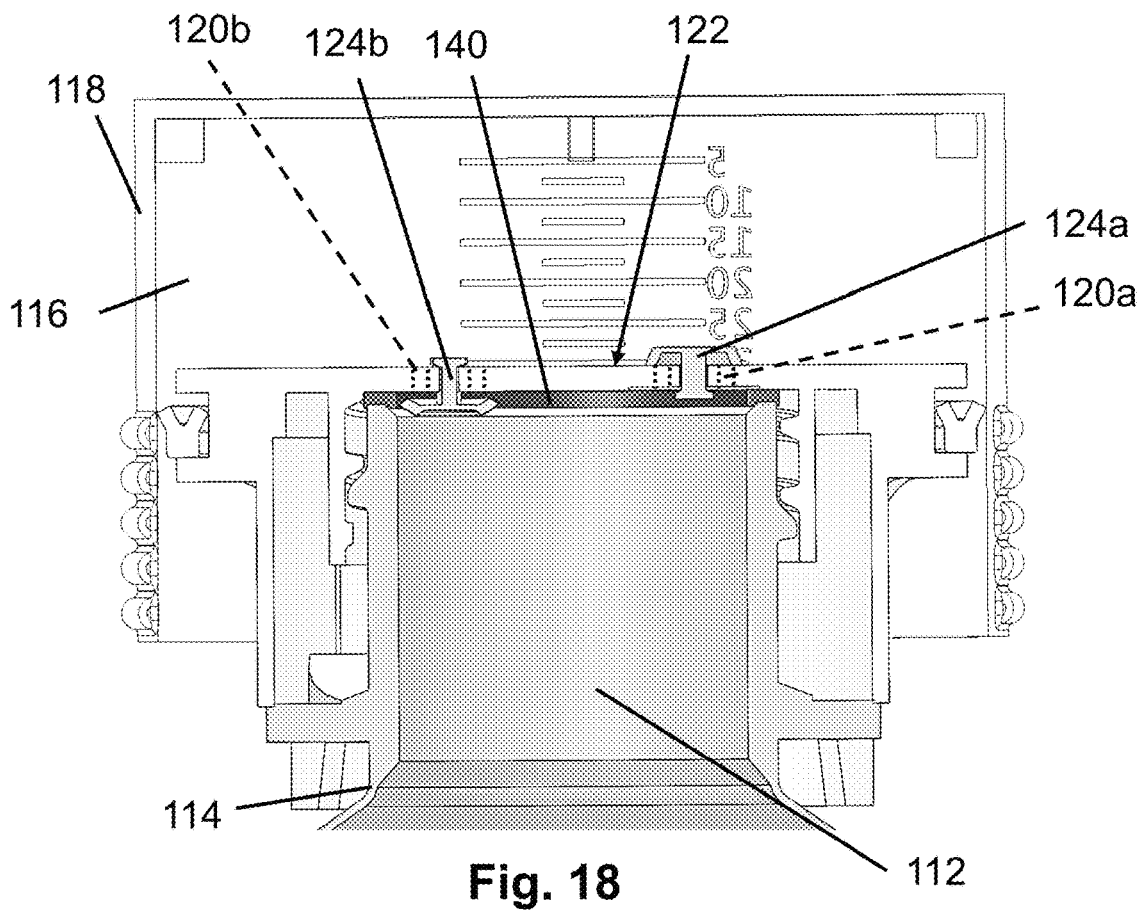
FIG. 18 is a cross-sectional side view of the fluid dispenser in FIG. 13 in an intermediate state in which one of the valves (e.g., air bleed valve) in an open state, and the other valve (e.g., liquid flow valve) in a closed state.
Figure 19:
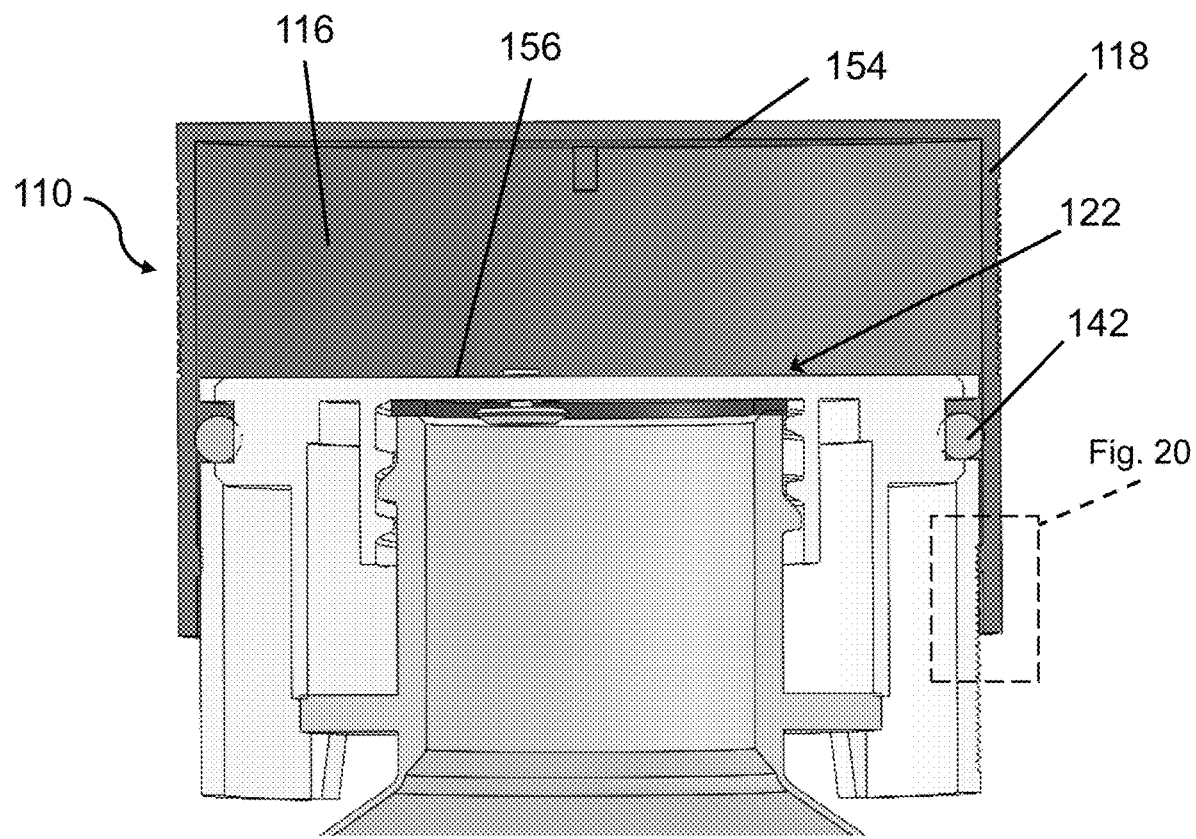
FIG. 19 is a cross-sectional side view of the fluid dispenser taken 90-degrees relative to the cross-sectional view in FIG. 16.

With particular reference to FIG. 16-18, an exemplary operation of filling the measurement chamber 116 will now be discussed.

FIG. 16 shows the dispenser in an exemplary initial state in which the two check valves 124a, 124b are both closed. The user will flip the assembly of the container 114 and dispenser 110 upside-down. This will create a head pressure of the liquid at the input side of the first check valve 124a. In exemplary embodiments, the head pressure 124a is not sufficient to meet or exceed the predefined cracking pressure of the first valve 124a, which is at least partially based upon a pressure differential of the pressure at the input side (liquid) exceeding the fluid pressure at the output side (air) by a predefined amount. As such, the user (or other mechanism) compresses the bottle with a compression force (such as by squeezing) which increases the pressure in the storage container 112 by a sufficient amount to meet or exceed the predefined crack pressure at which point the first check valve 124a opens the flow passage 120a for the liquid to fill the measurement chamber 116. It is noted that the crack pressure of the first check valve 124a may selected as desired based upon the volumes and pressures involved, or could be adapted to open based on head pressure without squeezing.

As the first check valve 124a is opened and liquid enters the measurement chamber 116, the volume of air in the measurement chamber 116 reduces thus increasing the pressure in the measurement chamber 116. At a certain point as the air volume reduces and the air pressure in the measurement chamber 116 continues to increase and is communicated to the input side of the second check valve 124b, the pressure differential from the input side (measurement chamber 116) to the output side (storage chamber 112) of the second valve 124b meets its cracking pressure so that the second fluid passage 120b is opened and allows the air to escape from the measurement chamber 116 to the top of the storage container 112. This state is shown in FIG. 17 in which both valves 124a and 124b are open.

When the compression force (squeezing) is released while the container is still turned upside-down, the pressure in the storage container 112 falls below the predefined cracking pressure so that the first check valve 124a closes the first flow passage 120a and no more liquid flows into the measurement chamber 116. Because the cracking pressure of the second check valve 124b may be set lower than the cracking pressure of the first check valve 124a, this allows the second check valve 124b (air bleed) to remain open for a period of time, as shown in FIG. 18, and then close.

In exemplary embodiments, the first and/or second check valve 124a, 124b may have a cracking pressure in a range from 1 kPa to 10 kPa, more particularly 1 kPa to 5 kPa, more particularly about 2 kPa, such as 1, 2, 3, 4, 5, 6, 7, 8, 9, or 10 kPa. As noted above, the second check valve 124b may have a lower cracking pressure than the first check valve 124a.

It is noted that the exemplary fluid dispenser 110 may operate without a pressure equalization tube interconnecting the air space at the top of the storage container 112 (when upside down) and measurement chamber 116. In the illustrated embodiment, this is not needed because the compression (e.g., squeezing) force on the bottle overcomes the vacuum effect created between the two chambers 112, 116. However, if such compression (e.g., squeezing) is not desired, or for other suitable reasons, then the dispenser 110 may include a pressure equalization tube (see e.g., 70 above). It is also understood that the dispenser 110 may include one or more other pressure equalization or vent features as may be desired, including vent passages, bleed valves, or the like which may communicate with the external environment, for example.

Turning now particularly to FIGS. 19-25, in exemplary embodiments, the dispenser 110 includes one or more features that enable the measurement chamber 116 to be adjustable to vary the fillable volume of space within the measurement chamber 116. Generally, the fillable volume of the measurement chamber 116 is at least partially defined by internal surfaces of the measurement container 118, and at least one internal surface of the measurement container is movable relative to the outlet of flow passage 120a and/or the divider 122 to adjust the fillable volume of the measurement chamber. In this manner, a user may measure and dispense a desired volume of fluid simply by pre-selectively adjusting the fillable volume of the measurement chamber 116 either before or during filling of the chamber with the fluid from the storage chamber 112 of the storage container 114. The ability to adjust the fillable volume of the measurement chamber 116 in this way provides several advantages, such as greater number of discrete graduated volumes to choose from as the measurement chamber 116 is adjusted. In alternative embodiments, however, the measurement chamber 116 may be fixed in place to form one or more fixed volumes of space. For example, the measurement chamber 116 may be divided into two or more sub-chambers via divider wall(s), in which the sub-chambers may have different volumes of space. In such an alternative embodiment, the user may preselect a desired fixed volume via any suitable action, such as by operably activating one or more valves via one or more flow paths to thereby fill the selected fixed volume of space. Alternatively, the dispenser 110 could be provided in a kit with a set of different size measurement containers 118 to provide adjustability of a fillable volume.

Figure 24:
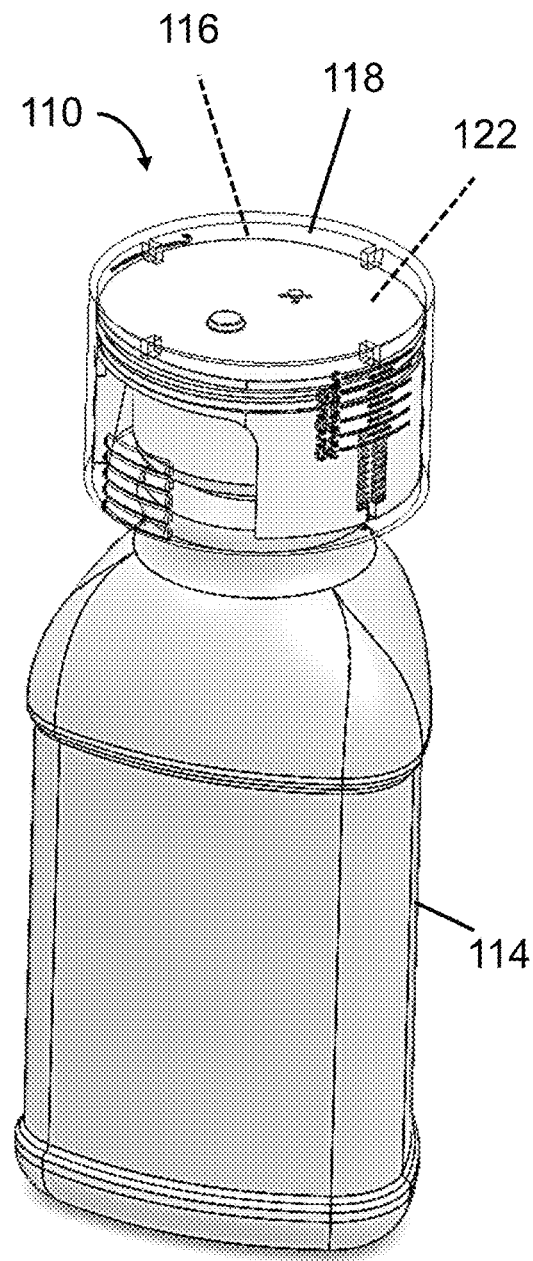
FIGS. 24 and 25 show exemplary adjustments of a fillable volume of the measurement chamber of the fluid dispenser in FIG. 13.
Figure 25:
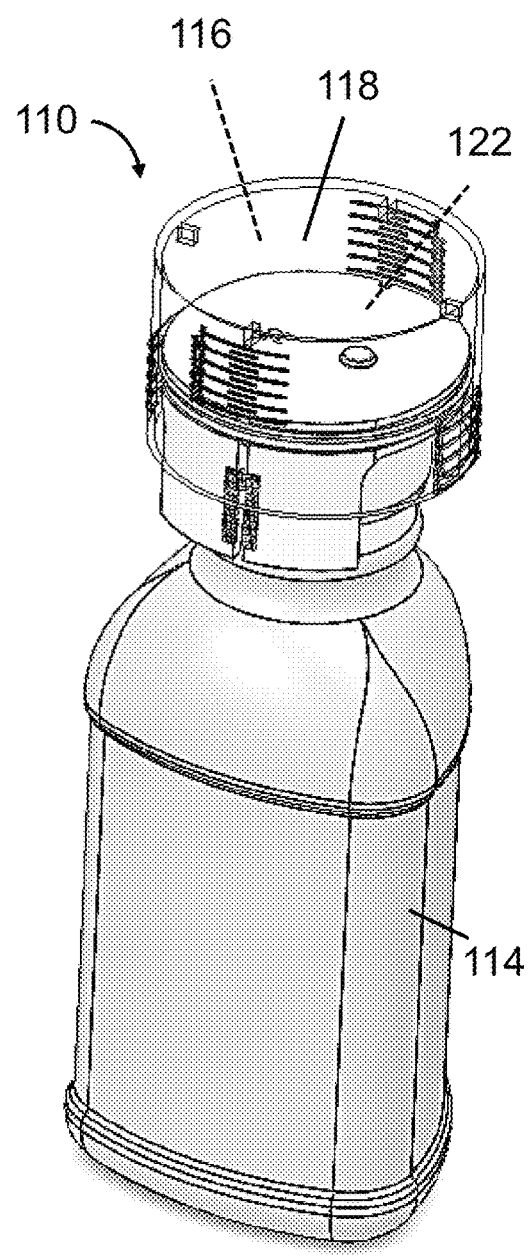

In the illustrated embodiment, referring to FIGS. 24 and 25, a bottom surface 154 of the measurement container 118 is axially movable toward or away from the upper surface 156 of the divider to adjust the fillable volume of the measurement chamber 116. As noted above, the measurement chamber 116 may be sealed with a suitable seal 142, which may cause sliding friction as the measurement container 118 is adjusted. Moreover, the seal may cause vacuum pressure in the internal measurement chamber 116. Thus, in exemplary embodiments, the measurement container 118 includes at least one part 130 this is configured to flex in response to an input force from a user to thereby deform the measurement container and release the seal 142 that seals the measurement chamber 116. In the illustrated embodiment, the flexible part 130 is aligned with indented or cutout portions 131 (FIGS. 14 and 15) of the intermediate part 122 to allow sufficient deformation of the measurement container 118 in response to input force (e.g., oblong deformation as shown with the dotted line in FIG. 23). These flexible portions may have ridges or other grips as tactile locators of where to squeeze.

Figure 20:
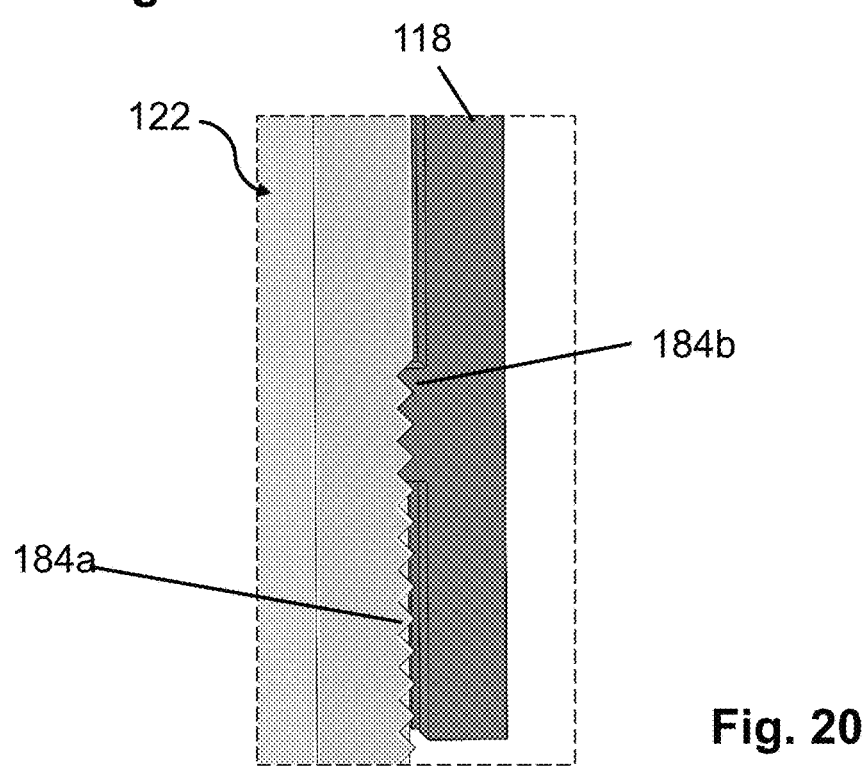
FIG. 20 is an enlarged view of a portion of the fluid dispenser shown in FIG. 19.
Figure 21:
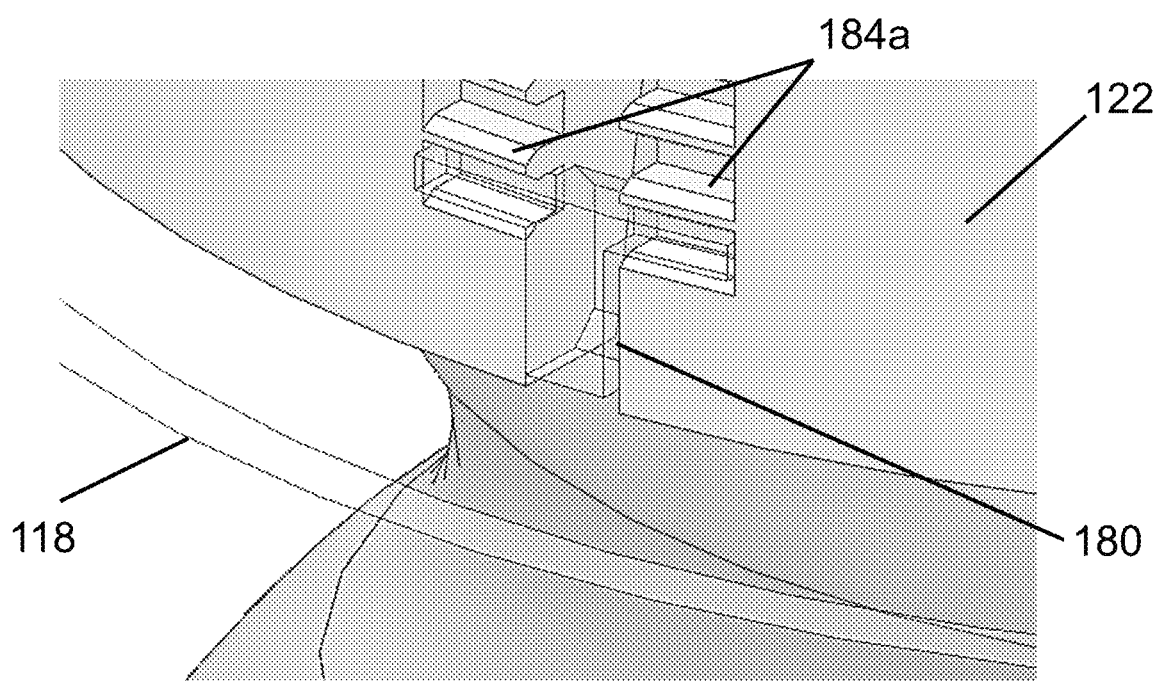
FIG. 21 is an enlarged perspective view of a portion of the fluid dispenser in FIG. 13.
Figure 22:
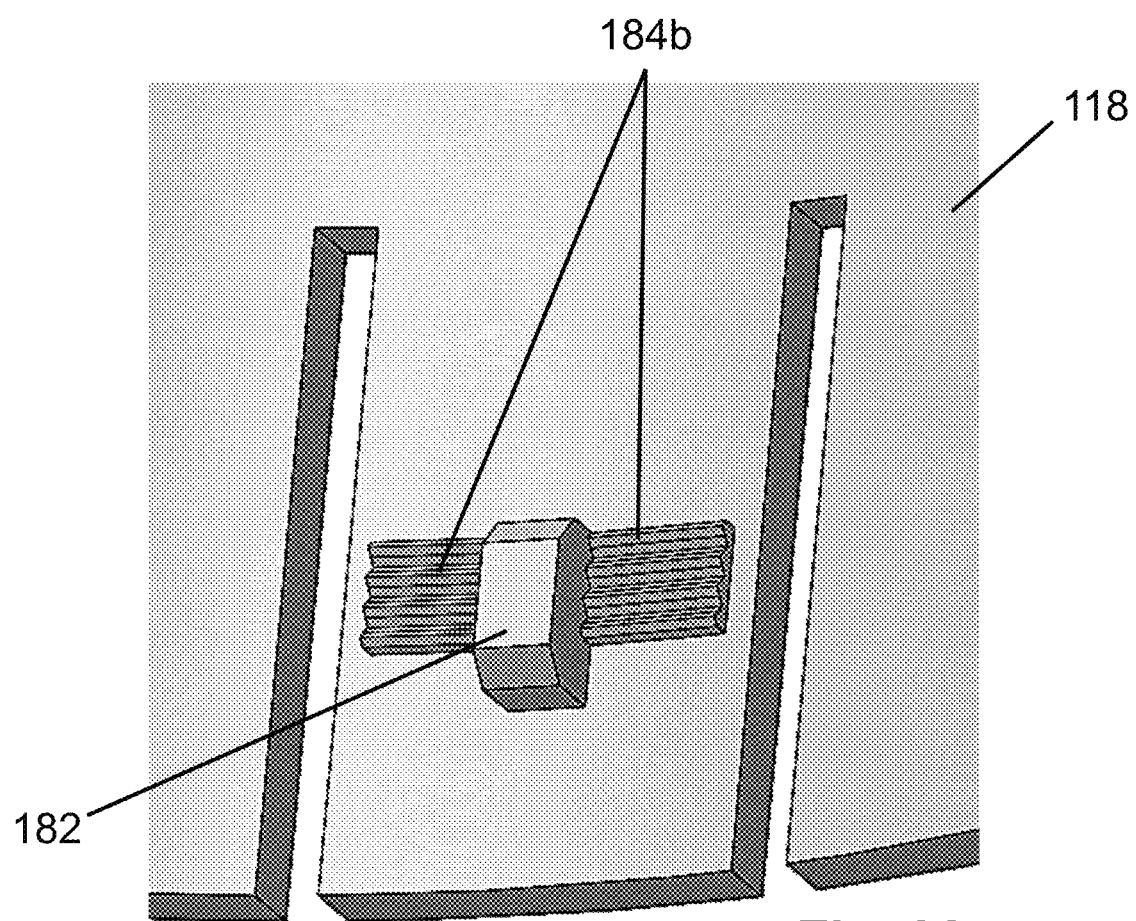
FIG. 22 is an enlarged perspective view of an inner portion of an exemplary measurement container of the dispenser in FIG. 13.
Figure 23:
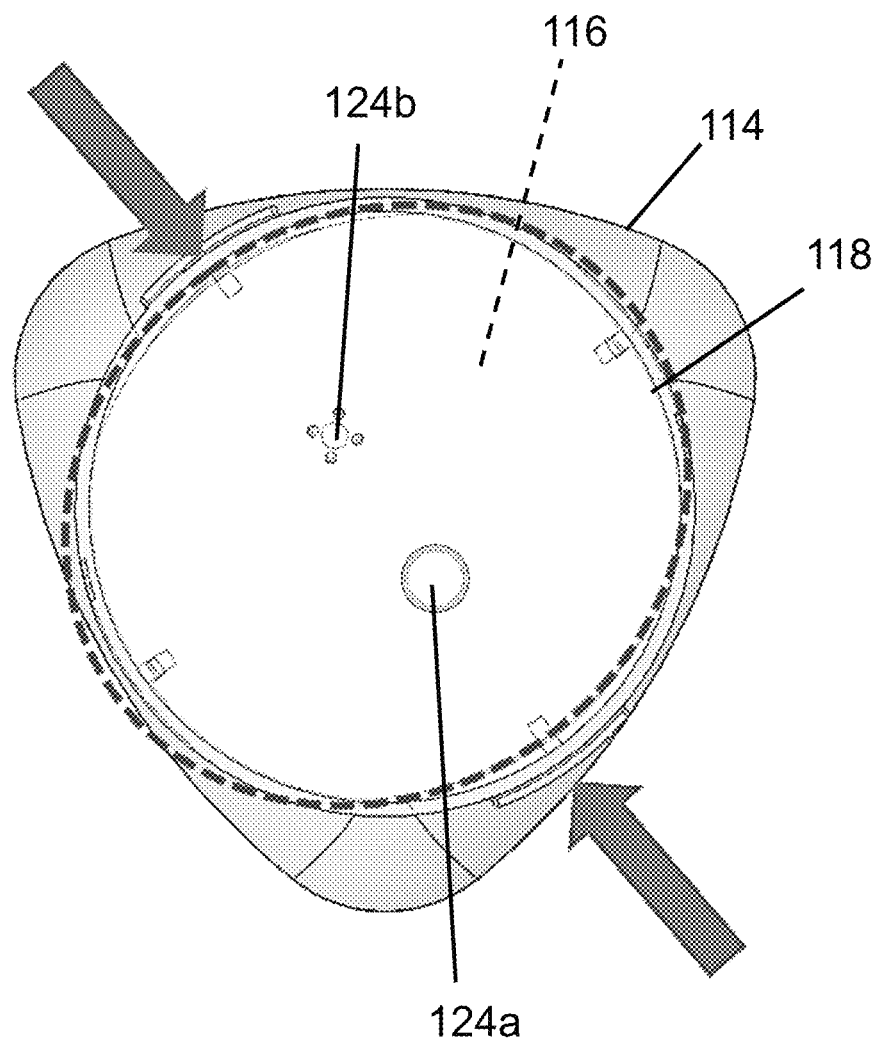
FIG. 23 is a top plan view of the fluid dispenser in FIG. 13 showing an adjustment state in which the exemplary measurement container is deformed for adjustment.

To properly orient and guide the measurement container 118 relative to the intermediate part/divider 122, or for other suitable reasons, the intermediate part 122 may include more axially extending guide slots 180 (FIG. 21) that slidably receive corresponding one or more guide protrusions 182 (FIG. 22) of the measurement container 118, such that the measurement container is slidably movable axially relative to the intermediate part to adjust the fillable volume of the measurement chamber 116. As shown, one or more detents, such as teeth 184, are arranged at an interface between the measurement container 118 and intermediate part 122 that are configured to indicate discrete graduated fillable volumes of the measurement chamber 116. In exemplary embodiments, both the measurement chamber 118 and intermediate part 122 have corresponding intermeshing teeth 184a, 184b (FIGS. 20-22). The axial spacing between the teeth 184a, 184b corresponds with an increase or decrease in the fillable volume of the measurement chamber, such as in the range from 1 mL to 5 mL or more.

Figure 26:
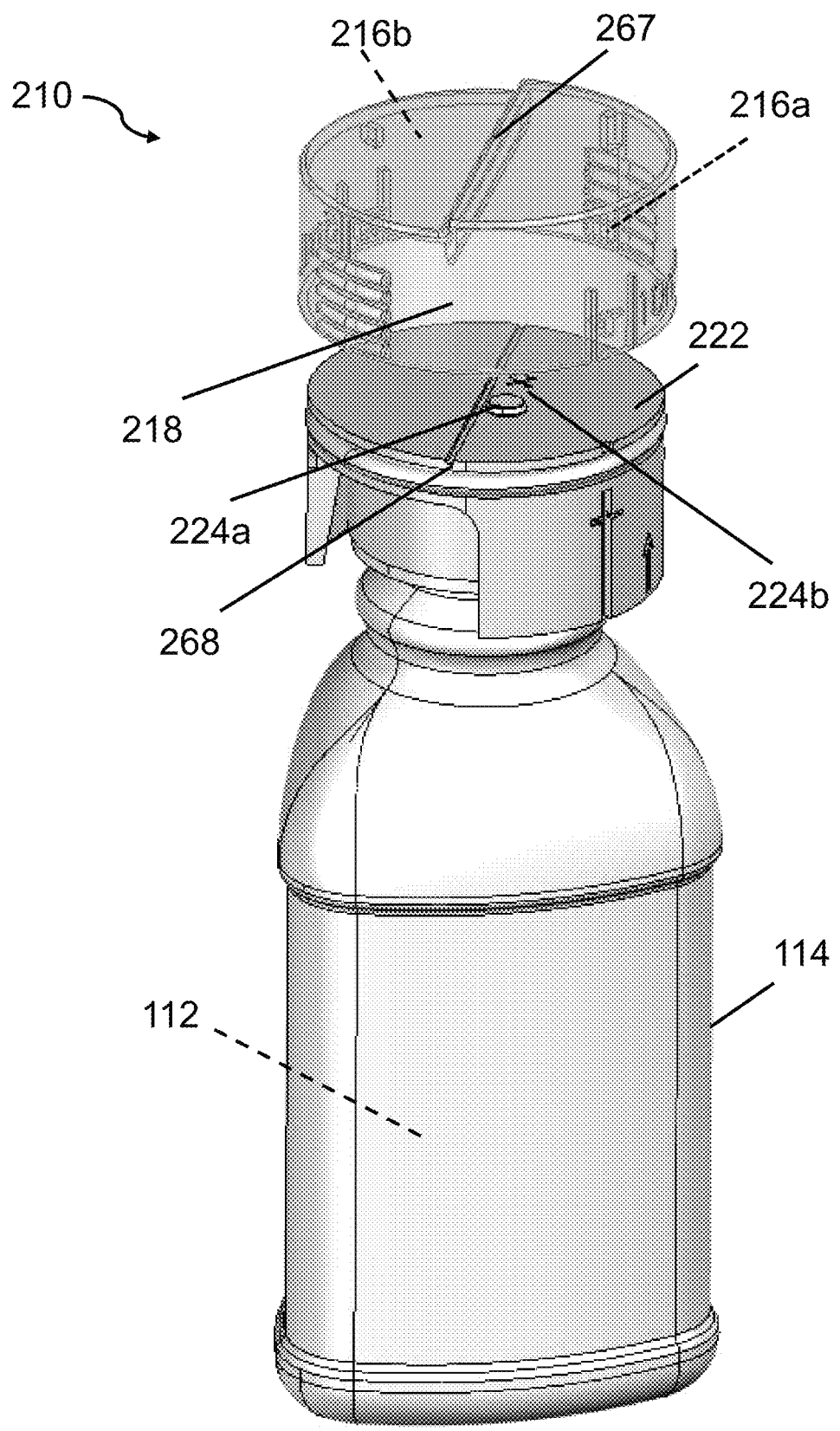
FIG. 26 is a partially exploded perspective view of another exemplary measured fluid dispenser and container according to another embodiment of the present disclosure.
Figure 27:
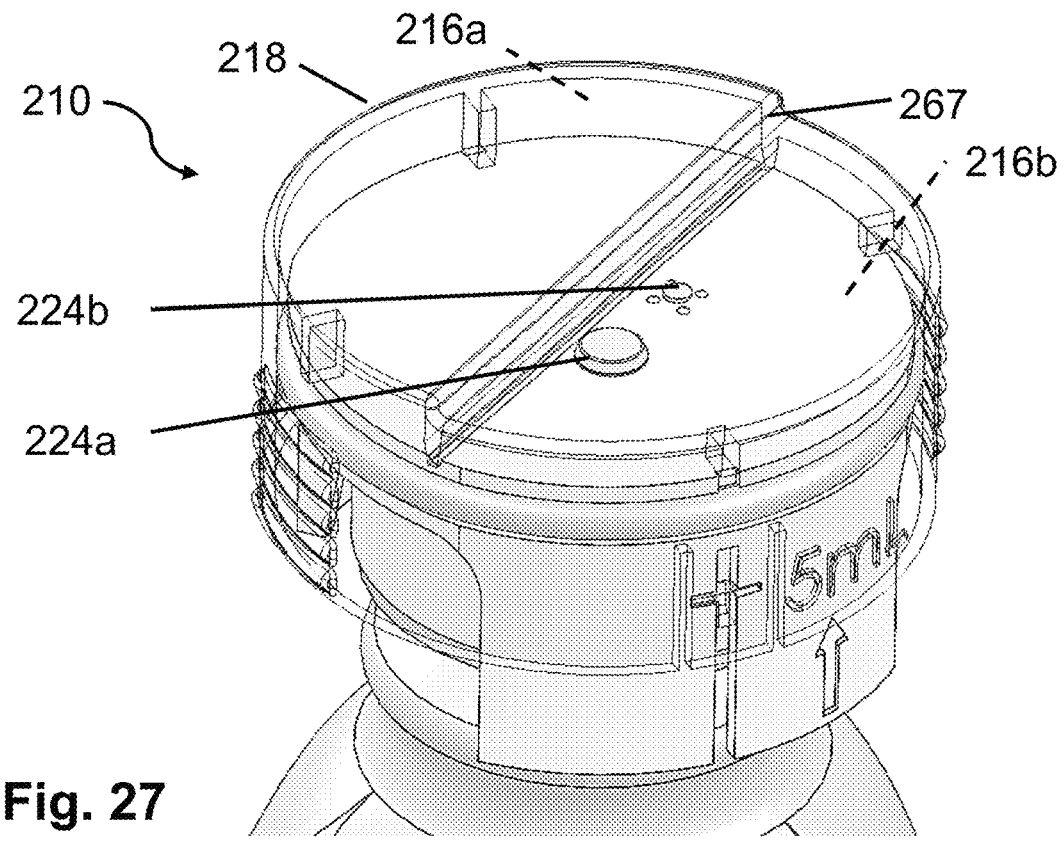
FIGS. 27 and 28 show exemplary adjustments of a fillable volume of the measurement chamber of the fluid dispenser in FIG. 26.
Figure 28:
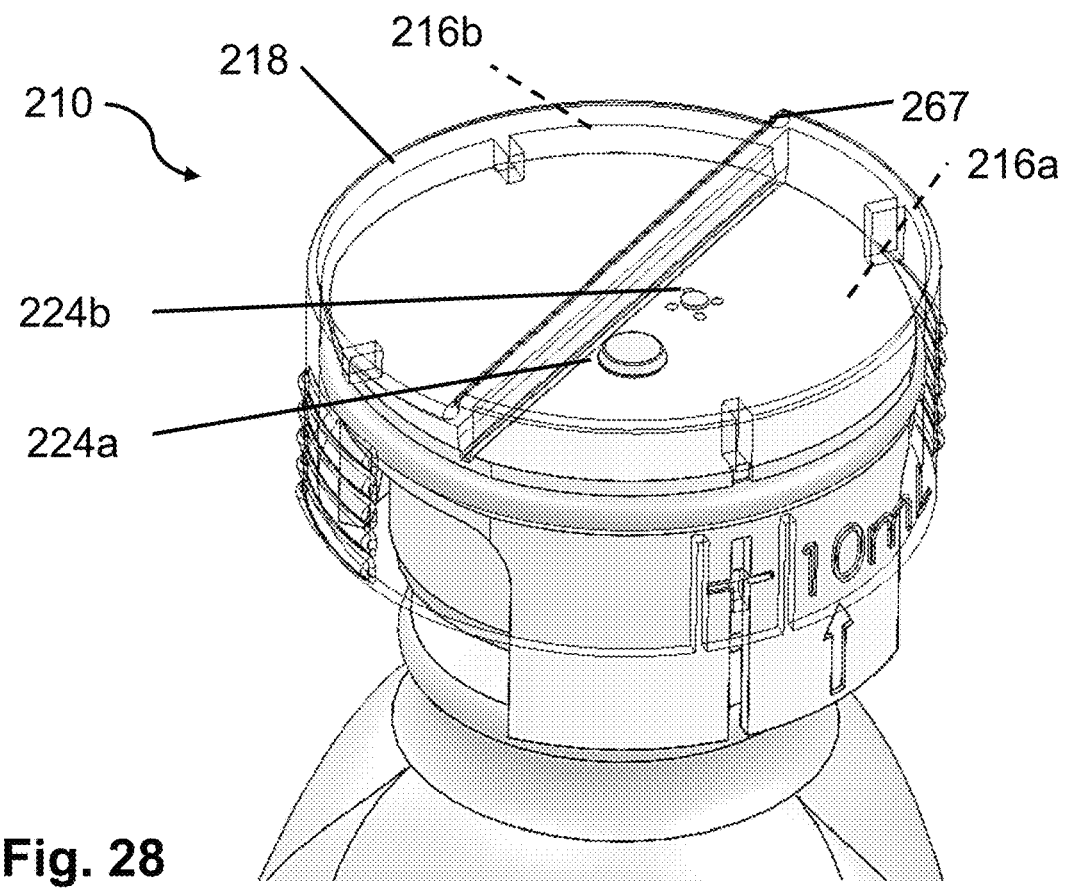

Turning now to FIGS. 26-28, another exemplary embodiment of a measured fluid dispenser 210 is shown. The fluid dispenser 210 is similar to the above-referenced fluid dispenser 110, and thus the same reference numerals except in the 200-series are used to connote the same or similar structures between the dispensers 110, 210. In addition, the foregoing description of the dispenser 110 is equally applicable to the fluid dispenser 110 except as noted below. Moreover, it is understood that that aspects of the fluid dispensers 10, 110, 210 may be substituted for one another or used in conjunction with one another where applicable.

Similarly to the dispensers 10, 110, the fluid dispenser 210 generally includes at least one internal measurement chamber 216 that defines a fillable volume for measuring a preselected quantity of fluid. The dispenser 210 also includes a divider 222 that fluidly separates a storage chamber 212 of a container 214 from the measurement chamber 216. At least one fluid flow passage 220 extends through the divider 222, and at least one suitable valve 224 is provided which is operative to open or close the fluid flow passage(s) 220 to thereby permit or restrict fluid flow between the storage chamber 212 and the measurement chamber 216. Like dispenser 110, the dispenser 210 may include two flow passages with corresponding two check valves 214a, 214b which may provide different functionality including liquid flow and air bleed as described above. Similar features of the divider 122 which may at least partially be formed by intermediate part (also 122) also are provided as divider/intermediate part 222.

In the illustrated embodiment, the measurement container 214 includes at least one dividing wall 267 that divides the measurement chamber into at least two measurement chamber regions 216a, 216b having differently sized fillable volumes. The volumes may be any suitable volume, such as in the range from 1 mL to 20 mL. In the illustrated embodiment, the fillable volume of chamber 216a is 10 mL and the fillable volume of chamber 216b is 5 m L. The fillable volume is adjustable by selecting one of the at least two measurement chamber regions 216a, 216b and arranging the selected chamber region relative to the divider/intermediate part 222 such that an outlet of the at least one fluid flow passage with at least one valve 224a opens into the selected chamber region. This is shown in FIG. 27 where the smaller 5 mL chamber 216b is chosen, or in FIG. 28 where the larger 10 mL chamber 216a is chosen. As shown, both valves 224a, 224b are on the side of the selected chamber region 216a or 216b. The valves 224a, 224b may be umbrella valves that operate the same as the umbrella valves 124a, 124b described above. The divider 222 may include a groove or other feature that enables improved sealability with the dividing wall 267 to prevent leakage between chambers 216a, 216b.

Exemplary measured fluid dispensers for dispensing fluid from a storage container has been shown and described herein. Generally, the measured fluid dispenser includes a measurement chamber, a fluid flow passage fluidly connecting the measurement chamber with the storage container, and a valve that is movable between an open position in which the fluid flow passage is opened to permit fluid flow from the storage chamber to the measurement chamber, and a closed position in which the fluid flow passage is closed to prevent fluid flow between the measurement chamber and the storage chamber. The measurement chamber may be adjustable to vary a fillable volume of the measurement chamber to thereby preselect an amount of fluid to be dispensed.

While one or more preferred forms of the exemplary fluid dispenser has/have been described above, it should be apparent to those skilled in the art that other fluid dispenser designs could also be used. For example, other suitable forms of the measurement container, measurement chamber(s), fluid flow passage(s), valve(s), etc., and/or the interaction thereof are possible, as would be understood by those having ordinary skill in the art. For example, the above-described adjustable measurement container (and corresponding components with which the measurement container interacts) could be used with the dispenser(s) shown and described in International Application No. PCT/US2019/026554 filed Apr. 9, 2019, which is incorporated herein by reference in its entirety. Likewise, one or more of the valve mechanism(s) (and other suitable features) from PCT/US2019/026554 could be used in the above-described dispenser.

According to an aspect, a fluid dispenser is provided that is configured to measure and dispense a prescribed quantity of fluid from a container with improved accuracy and ease.

According to another aspect, a fluid dispenser is provided that enables a user to selectively adjust a fillable volume of a fluid chamber of the dispenser for dispensing the preselected quantity of fluid.

According to an aspect, an adjustable measured fluid dispenser for dispensing fluid from a storage chamber of a storage container includes: a measurement chamber; at least one fluid flow passage configured to fluidly connect the measurement chamber with the storage chamber; at least one valve that is movable between a first position in which the at least one fluid flow passage is opened to permit fluid flow from the storage chamber to the measurement chamber, and a second position in which the at least one fluid flow passage is closed to prevent fluid flow between the measurement chamber and the storage chamber; wherein a fillable volume of the measurement chamber is adjustable to adjust an amount of fluid to be contained in the measurement chamber.

Embodiments may include one or more of the following additional features, separately or in any combination.

In some embodiments, the adjustable measured fluid dispenser further includes a divider that separates the measurement chamber from the storage chamber, the divider having at least one outlet of the at least one fluid flow passage that opens into the measurement chamber.

In some embodiments, the measurement chamber is at least partially formed by internal surfaces of a measurement container, wherein a bottom internal surface of the measurement container is movable relative to the outlet and/or the divider to adjust the fillable volume of the measurement chamber.

In some embodiments, the measurement container is axially movable relative to the outlet and/or the divider to adjust the fillable volume of the measurement chamber.

In some embodiments, the divider is formed by an intermediate part of the dispenser, the intermediate part having one or more axially extending guides that are slidably received by corresponding one or more guide slots in the measurement container, such that the measurement container is slidably movable axially relative to the intermediate part to adjust the fillable volume of the measurement chamber.

In some embodiments, the one or more axially extending guides are flexibly movable and include a hook that engages with respective detents on the measurement container to indicate discrete graduated fillable volumes of the measurement chamber.

In some embodiments, the respective detents are formed by axially spaced apart teeth, and wherein the axial spacing between the teeth corresponds with an increase or decrease in the fillable volume of the measurement chamber in the range from 1 mL to 5 mL.

In some embodiments, the adjustable measured fluid dispenser further includes an intermediate part having a divider that separates the measurement chamber from the storage chamber, the divider having at least one outlet of the at least one fluid flow passage that opens into the measurement chamber.

In some embodiments, the measurement chamber is at least partially formed by internal surfaces of a measurement cup, the measurement cup being securably couplable to and removable from the intermediate part.

In some embodiments, the intermediate part includes at least one flexure that is engageable with at least one catch of the measurement cup to restrict removal of the measurement cup, and wherein the at least one flexure is movable by a user to release from the at least one catch thereby enabling removal of the measurement cup from the intermediate part.

In some embodiments, the measurement cup is axially movable relative to the intermediate part for adjusting the fillable volume of the measurement chamber.

In some embodiments, the at least one flexure of the intermediate part forms at least one axially extending guide that is slidably engageable with the measurement cup to guide axial movement of the measurement cup relative to the intermediate part.

In some embodiments, the adjustable measured fluid dispenser further includes an intermediate part having a divider that separates the measurement chamber from the storage chamber, the divider having the at least one fluid flow passage with a first port opening into the measurement chamber and a second port opening into the storage chamber.

In some embodiments, the intermediate part includes or at least partially forms the at least one valve.

In some embodiments, the at least valve is a lip check valve, a rotating disc valve, a spool valve, or a gate valve.

In some embodiments, the at least one valve is a rotating valve in which a first valve part includes a first portion of the at least one fluid flow passage that opens into the storage chamber, and in which a second valve part includes a second portion of the at least one fluid flow passage that opens into the measurement chamber.

In some embodiments, the second valve part is rotatable relative to the first valve part, and/or wherein the first valve part is rotatable relative to the second valve part.

In some embodiments, when in a closed state, the first valve part and the second valve part are oriented relative to each other such that the first portion of the at least one fluid flow passage is misaligned with the second portion of the at least fluid flow passage.

In some embodiments, when in an open state, the first valve part and the second part are oriented relative to each other such that the first portion of the at least one fluid flow passage is aligned with the second portion of the at least fluid flow passage.

In some embodiments, the first valve part and the second valve part together form at least a portion of a divider of an intermediate part of the dispenser.

In some embodiments, the measurement chamber is at least partially formed by a measurement container, the measurement container being movable relative to the intermediate part to selectively adjust the fillable volume of the measurement chamber, and wherein the measurement container is securably couplable to and removable from the intermediate part.

In some embodiments, the rotating valve includes a first stop that restricts further rotational movement of the first valve part and/or the second valve part beyond the first position, and includes a second stop circumferentially spaced from the first stop, the second stop restricting further rotational movement of the first valve part and/or the second valve part beyond the second position.

In some embodiments, the rotating valve includes a lock mechanism including a detent that locks the rotating valve when in the closed state.

In some embodiments, the detent includes a tapered interface between the first valve part and the second valve part that enables a user to unlock the rotating valve with a rotational force.

In some embodiments, the adjustable measured fluid dispenser further includes a pressure equalization tube having a first opening in fluid communication with air inside the storage chamber, and a second opening in fluid communication with the measurement chamber.

In some embodiments, the measurement chamber is sealed from an external environment, and wherein a divider between the measurement chamber and the storage container includes one or more vent passages that facilitate adjustment of the fillable volume of the measurement chamber.

According to another aspect, a measured fluid dispenser for dispensing fluid from a storage chamber of a storage container includes: a measurement chamber; a fluid flow passage configured to fluidly connect the measurement chamber with the storage chamber; a valve that is movable between an open position in which the fluid flow passage is opened to permit fluid flow from the storage chamber to the measurement chamber, and a closed position in which the fluid flow passage is closed to prevent fluid flow between the measurement chamber and the storage chamber; wherein the valve is a rotating valve in which a first valve part includes a first portion of the fluid flow passage that is in fluid communication with the storage chamber, and in which a second valve part includes a second portion of the fluid flow passage that is in fluid communication with the measurement chamber; wherein the second valve part is rotatable relative to the first valve part, and/or wherein the first valve part is rotatable relative to the second valve part; wherein, when in the closed position, the first valve part and the second valve part are oriented relative to each other such that the first portion of the at least one fluid flow passage is misaligned with the second portion of the at least fluid flow passage; and wherein, when in an open position, the first valve part and the second part are oriented relative to each other such that the first portion of the at least one fluid flow passage is aligned with the second portion of the at least fluid flow passage.

Embodiments may include one or more of the foregoing additional features and/or one or more of the following additional features, separately or in any combination.

In some embodiments, the first valve part and the second valve part together form at least a portion of a divider that separates the measurement chamber from the storage chamber.

In some embodiments, the measurement chamber is at least partially formed by internal surfaces of a measurement container and a surface of the divider.

In some embodiments, the measurement container is movable relative to the divider to selectively adjust a fillable volume of the measurement chamber to preselect an amount of fluid to be contained in the measurement chamber.

According to another aspect, an adjustable measured fluid dispenser for dispensing fluid from a storage chamber of a storage container includes: a measurement chamber of a measurement container having a fillable volume; a divider configured to separate the measurement chamber from the storage chamber of the container; at least one fluid flow passage extending through the divider and being configured to fluidly connect the measurement chamber with the storage chamber of the container; at least one check valve configured to open the at least one fluid flow passage and permit fluid flow from the storage chamber to the measurement chamber, and configured to close the at least one fluid flow passage to prevent fluid flow between the measurement chamber and the storage chamber, the at least one check valve being configured to open at a predefined cracking pressure; and wherein the fillable volume of the measurement chamber is adjustable to adjust an amount of fluid to be contained in the measurement chamber.

According to another aspect, a measured fluid dispenser for dispensing fluid from a storage chamber of a storage container includes: a measurement chamber of a measurement container having a fillable volume; a cap operably couplable to the container, the cap at least partially forming a divider configured to separate the measurement chamber from the storage chamber of the container; a first flow passage and a second flow passage, each extending through the divider and being configured to fluidly connect the measurement chamber with the storage chamber of the container; a first check valve configured to open the first flow passage and permit liquid to flow in one direction from the storage chamber to the measurement chamber, and configured to close the first flow passage to prevent liquid flow between the measurement chamber and the storage chamber; a second check valve configured to open the second flow passage and permit air to flow in one direction from the measurement chamber to the storage chamber, and configured to close the second flow passage to prevent fluid flow between the measurement chamber and the storage chamber; wherein the first check valve is configured to open at a first predefined cracking pressure to permit liquid to flow through the first flow passage from the storage chamber of the container into the measurement chamber, and the second check valve is configured to open at a second predefined cracking pressure to permit air in the measurement chamber that is displaced by the liquid to escape from the measurement chamber into the storage chamber of the container; and wherein the second cracking pressure is lower than the first cracking pressure.

According to another aspect, an adjustable measured fluid dispenser for dispensing fluid from a storage chamber of a storage container includes: a measurement chamber of a measurement container having a fillable volume; a cap operably couplable to the container, the cap at least partially forming a divider configured to separate the measurement chamber from the storage chamber of the container, the measurement container being fluidly sealed to the cap with at least one seal; at least one fluid flow passage extending through the divider and being configured to fluidly connect the measurement chamber with the storage chamber of the container; and at least one valve configured to open the at least one fluid flow passage and permit fluid flow from the storage chamber to the measurement chamber, and configured to close the at least one fluid flow passage to prevent fluid flow between the measurement chamber and the storage chamber; the cap having one or more axially extending guide slots that slidably receive and guide corresponding one or more radially inwardly extending guide protrusions on an inner portion of the measurement container, such that the measurement container is slidably movable axially upwardly and downwardly relative to the cap to adjust the fillable volume of the measurement chamber, and one or more detents arranged at an interface between the cap and measurement container that are configured to indicate discrete graduated fillable volumes of the measurement chamber.

According to another aspect, a method of dispensing fluid from a measured fluid dispenser includes: adjusting the measurement chamber to a desired amount of fluid to be contained in the measurement chamber; turning the measured fluid dispenser upside-down; squeezing the storage container of the adjustable fluid dispenser until the measurement chamber is filled; and dispensing the fluid from the measurement container. The dispensing may include removing the filled measurement chamber from the adjustable fluid measured dispenser while the container is upside-down, or may include opening a closure of the measurement container to dispense the fluid.

Embodiment(s) of the invention may include one or more features of the foregoing aspects, separately or in any suitable combination, which may be combined with one or more of the following additional features, which may be included separately or in any suitable combination.

In some embodiments, the at least one fluid flow passage includes a first fluid flow passage, the dispenser further comprising a second fluid flow passage extending through the divider and being configured to fluidly connect the measurement chamber with the storage chamber of the container.

In some embodiments, the dispenser is configured to permit liquid to flow through the first fluid flow passage from the storage chamber of the container into the measurement chamber in response to opening of the at least one check valve, and is configured to permit air in the measurement chamber that is displaced by the liquid to escape from the measurement chamber into the storage chamber of the container via the second fluid flow passage.

In some embodiments, the at least one check valve includes a first check valve, the at least one fluid flow passage includes a first fluid flow passage, and the predefined cracking pressure is a first predefined cracking pressure.

In some embodiments, the dispenser further comprising a second fluid flow passage extending through the divider and being configured to fluidly connect the measurement chamber with the storage chamber of the container, and further comprising a second check valve configured to open or close the second fluid flow passage, the second check valve being configured to open at a second predefined cracking pressure.

In some embodiments, the first check valve being configured to open at the first cracking pressure to permit liquid to flow through the first fluid flow passage from the storage chamber of the container into the measurement chamber.

In some embodiments, the second check valve being configured to open at the second cracking pressure to permit air in the measurement chamber that is displaced by the liquid to escape from the measurement chamber into the storage chamber of the container.

In some embodiments, the first and second check valves are respectively configured such that the first cracking pressure is different from the second cracking pressure, so that the first and second check valves are activated to open or close at different times when the dispenser is in use.

In some embodiments, the first and second check valves are respectively configured such that the second cracking pressure is lower than the first cracking pressure.

In some embodiments, the first and/or second check valve is a one-piece elastomeric valve.

In some embodiments, the first and/or second check valve is an umbrella valve having a sealing disc that seals against the divider to close the respective first and/or second fluid flow passage, and in which the sealing disc separates from the divider to open the respective first and/or second fluid flow passage.

In some embodiments, the measurement chamber is sealed from an environment external to the assembly.

In some embodiments, an input side of the at least one check valve is exposed to fluid pressure from the storage chamber of the container, and an output side of the at least one check valve is exposed fluid pressure from the measurement chamber, wherein the predefined crack pressure is at least partially based upon a pressure differential at the input side relative to the output side, in which the at least one check valve is configured to open when the fluid pressure in the storage container exceeds the fluid pressure in the measurement chamber by a predefined amount.

In some embodiments, the at least one check valve is configured to open when the container is turned upside-down and compressed with a compression force to thereby increase the fluid pressure in the storage container to meet or exceed the predefined crack pressure, and is configured to close at least when the compression force is released while the container is still turned upside-down.

In some embodiments, the predefined crack pressure for the first and/or second check valve is in a range from 1 kPa to 10 kPa, more particularly 1 kPa to 5 kPa, more particularly about 2 kPa, such as 1, 2, 3, 4, 5, 6, 7, 8, 9, or 10 kPa.

In some embodiments, the divider has at least one outlet of the at least one fluid flow passage that opens into the measurement chamber.

In some embodiments, the fillable volume of the measurement chamber is at least partially defined by internal surfaces of the measurement container, wherein at least one internal surface of the measurement container is movable relative to the outlet and/or the divider to adjust the fillable volume of the measurement chamber.

In some embodiments, a bottom surface of the measurement container is axially movable toward or away from the outlet and/or the divider to adjust the fillable volume of the measurement chamber.

In some embodiments, the measurement container is a measurement cup that is securably couplable to and removable from the divider and/or container.

In some embodiments, the divider is at least partially formed by an intermediate part of the dispenser, the intermediate part being in the form of a cap that is threadable to the container to cover an opening of the container.

In some embodiments, the divider is at least partially formed by an intermediate part of the dispenser, the intermediate part having one or more axially extending guide slots that slidably receive corresponding one or more guide protrusions of the measurement container, such that the measurement container is slidably movable axially relative to the intermediate part to adjust the fillable volume of the measurement chamber.

In some embodiments, the intermediate part and/or the measurement container includes detents that are arranged to indicate discrete graduated fillable volume of the measurement chamber.

In some embodiments, the respective detents are formed by axially spaced apart teeth, and wherein the axial spacing between the teeth corresponds with an increase or decrease in the fillable volume of the measurement chamber in the range from 1 mL to 5 mL.

In some embodiments, the measurement container includes at least one part this is configured to flex in response to an input force from a user to thereby deform the measurement container and release at least one of: a detent, a catch, a locking mechanism, or a seal that seals the measurement chamber.

In some embodiments, the measurement container includes at least one dividing wall that divides the measurement chamber into at least two measurement chamber regions having differently sized fillable volumes.

In some embodiments, the fillable volume is adjustable by selecting one of the at least two measurement chamber regions and arranging the selected chamber region relative to the divider such that an outlet of the at least one fluid flow passage opens into the selected chamber region.

In the discussion above, the terms "upper", "lower", "top", "bottom," "end," "inner," "left," "right," "above," "below," "horizontal," "vertical," etc. refer to the measured fluid dispenser as viewed in a horizontal position, as shown in FIG. 1, for example. Such relative positional terms as used in this disclosure are understood to refer to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

As used herein, an "operable connection," or a connection by which entities are "operably connected," is one in which the entities are connected in such a way that the entities may perform as intended. An operable connection may be a direct connection or an indirect connection in which an intermediate entity or entities cooperate or otherwise are part of the connection or are in between the operably connected entities. An operable connection or coupling may include the entities being integral and unitary with each other.

It is to be understood that all ranges and ratio limits disclosed in the specification and claims may be combined in any manner. It is to be understood that unless specifically stated otherwise, references to "a," "an," and/or "the" may include one or more than one, and that reference to an item in the singular may also include the item in the plural.

The phrase "and/or" should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

The word "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," may refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

The phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The transitional words or phrases, such as "comprising," "including," "carrying," "having," "containing," "involving," "holding," and the like, are to be understood to be open-ended, i.e., to mean including but not limited to.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An adjustable measured fluid dispenser for dispensing fluid from a storage chamber of a storage container, the fluid dispenser comprising:
   a measurement chamber of a measurement container having a fillable volume; a divider configured to separate the measurement chamber from the storage chamber of the container;
   at least one fluid flow passage extending through the divider and being configured to fluidly connect the measurement chamber with the storage chamber of the container;
   at least one check valve configured to open the at least one fluid flow passage and permit fluid flow from the storage chamber to the measurement chamber, and configured to close the at least one fluid flow passage to prevent fluid flow between the measurement chamber and the storage chamber, the at least one check valve being configured to open at a predefined cracking pressure; and wherein the fillable volume of the measurement chamber is adjustable to adjust an amount of fluid to be contained in the measurement chamber;

the at least one check valve includes a first check valve, the at least one fluid flow passage includes a first fluid flow passage, and the predefined cracking pressure is a first predefined cracking pressure, the dispenser further comprising a second fluid flow passage extending through the divider and being configured to fluidly connect the measurement chamber with the storage chamber of the container, and further comprising a second check valve configured to open or close the second fluid flow passage, the second check valve being configured to open at a second predefined cracking pressure, the first check valve being configured to open at the first cracking pressure to permit liquid to flow through the first fluid flow passage from the storage chamber of the container into the measurement chamber, the second check valve being configured to open at the second cracking pressure to permit air in the measurement chamber that is displaced by the liquid to escape from the measurement chamber into the storage chamber of the container; and wherein the first and/or second check valve is an umbrella valve having a sealing disc that seals against the divider to close the respective first and/or second fluid flow passage, and in which the sealing disc separates from the divider to open the respective first and/or second fluid flow passage.

2. The adjustable measured fluid dispenser according to claim 1,
wherein the at least one fluid flow passage includes a first fluid flow passage, the dispenser further comprising a second fluid flow passage extending through the divider and being configured to fluidly connect the measurement chamber with the storage chamber of the container,
wherein the dispenser is configured to permit liquid to flow through the first fluid flow passage from the storage chamber of the container into the measurement chamber in response to opening of the at least one check valve, and is configured to permit air in the measurement chamber that is displaced by the liquid to escape from the measurement chamber into the storage chamber of the container via the second fluid flow passage.

3. The adjustable measured fluid dispenser according to claim 1,
wherein the first and second check valves are respectively configured such that the first cracking pressure is different from the second cracking pressure, so that the first and second check valves are activated to open or close at different times when the dispenser is in use.

4. The adjustable measured fluid dispenser according to claim 1,
wherein the first and second check valves are respectively configured such that the second cracking pressure is lower than the first cracking pressure.

5. The adjustable measured fluid dispenser according to claim 1,
wherein the first and/or second check valve is a one-piece elastomeric valve.

6. The adjustable measured fluid dispenser according to claim 1,
wherein both the first check valve and the second check valve are umbrella valves.

7. The adjustable measured fluid dispenser according to claim 1, in combination with the container to form an assembly, the assembly being configured such that:
the measurement chamber is sealed from an environment external to the assembly;
an input side of the at least one check valve is exposed to fluid pressure from the storage chamber of the container, and an output side of the at least one check valve is exposed fluid pressure from the measurement chamber, wherein the predefined crack pressure is at least partially based upon a pressure differential at the input side relative to the output side, in which the at least one check valve is configured to open when the fluid pressure in the storage container exceeds the fluid pressure in the measurement chamber by a predefined amount;
wherein the at least one check valve is configured to open when the container is turned upside-down and compressed with a compression force to thereby increase the fluid pressure in the storage container to meet or exceed the predefined crack pressure, and is configured to close at least when the compression force is released while the container is still turned upside-down.

8. The adjustable measured fluid dispenser according to claim 1, wherein the predefined crack pressure for the first and/or second check valve is in a range from 1 kPa to 10 kPa.

9. The adjustable measured fluid dispenser according to claim 1,
wherein the divider has at least one outlet of the at least one fluid flow passage that opens into the measurement chamber; and
wherein the fillable volume of the measurement chamber is at least partially defined by internal surfaces of the measurement container, wherein at least one internal surface of the measurement container is movable relative to the outlet and/or the divider to adjust the fillable volume of the measurement chamber.

10. A method of dispensing fluid from a measured fluid dispenser, comprising:
providing the measured fluid dispenser according to claim 1;
adjusting the measurement chamber to a desired amount of fluid to be contained in the measurement chamber
turning the measured fluid dispenser upside-down;
squeezing the storage container of the adjustable fluid dispenser until the measurement chamber is filled; and
dispensing the fluid from the measurement container.

11. An adjustable measured fluid dispenser for dispensing fluid from a storage chamber of a storage container, the fluid dispenser comprising:
a measurement chamber of a measurement container having a fillable volume; a divider configured to separate the measurement chamber from the storage chamber of the container;
at least one fluid flow passage extending through the divider and being configured to fluidly connect the measurement chamber with the storage chamber of the container;
at least one check valve configured to open the at least one fluid flow passage and permit fluid flow from the storage chamber to the measurement chamber, and configured to close the at least one fluid flow passage to prevent fluid flow between the measurement chamber and the storage chamber, the at least one check valve being configured to open at a predefined cracking pressure;

wherein the fillable volume of the measurement chamber is adjustable to adjust an amount of fluid to be contained in the measurement chamber;

wherein the divider has at least one outlet of the at least one fluid flow passage that opens into the measurement chamber;

wherein the fillable volume of the measurement chamber is at least partially defined by internal surfaces of the measurement container, wherein at least one internal surface of the measurement container is movable relative to the outlet and/or the divider to adjust the fillable volume of the measurement chamber; and wherein a bottom surface of the measurement container is axially movable toward or away from the outlet and/or the divider to adjust the fillable volume of the measurement chamber.

12. The adjustable measured fluid dispenser according to claim 1, wherein the measurement container is a measurement cup that is securably couplable to and removable from the divider and/or container.

13. The adjustable measured fluid dispenser according to claim 1, wherein the divider is at least partially formed by an intermediate part of the dispenser, the intermediate part being in the form of a cap that is threadable to the container to cover an opening of the container.

14. An adjustable measured fluid dispenser for dispensing fluid from a storage chamber of a storage container, the fluid dispenser comprising:

a measurement chamber of a measurement container having a fillable volume; a divider configured to separate the measurement chamber from the storage chamber of the container;

at least one fluid flow passage extending through the divider and being configured to fluidly connect the measurement chamber with the storage chamber of the container;

at least one check valve configured to open the at least one fluid flow passage and permit fluid flow from the storage chamber to the measurement chamber, and configured to close the at least one fluid flow passage to prevent fluid flow between the measurement chamber and the storage chamber, the at least one check valve being configured to open at a predefined cracking pressure;

wherein the fillable volume of the measurement chamber is adjustable to adjust an amount of fluid to be contained in the measurement chamber;

wherein the divider is at least partially formed by an intermediate part of the dispenser, the intermediate part having one or more axially extending guide slots that slidably receive corresponding one or more guide protrusions of the measurement container, such that the measurement container is slidably movable axially relative to the intermediate part to adjust the fillable volume of the measurement chamber, and wherein the intermediate part and/or the measurement container includes detents that are arranged to indicate discrete graduated fillable volume of the measurement chamber.

15. The adjustable measured fluid dispenser according to claim 14, wherein the respective detents are formed by axially spaced apart teeth, and wherein the axial spacing between the teeth corresponds with an increase or decrease in the fillable volume of the measurement chamber in the range from 1 mL to 5 mL.

16. An adjustable measured fluid dispenser for dispensing fluid from a storage chamber of a storage container, the fluid dispenser comprising:

a measurement chamber of a measurement container having a fillable volume; a divider configured to separate the measurement chamber from the storage chamber of the container;

at least one fluid flow passage extending through the divider and being configured to fluidly connect the measurement chamber with the storage chamber of the container;

at least one check valve configured to open the at least one fluid flow passage and permit fluid flow from the storage chamber to the measurement chamber, and configured to close the at least one fluid flow passage to prevent fluid flow between the measurement chamber and the storage chamber, the at least one check valve being configured to open at a predefined cracking pressure;

wherein the fillable volume of the measurement chamber is adjustable to adjust an amount of fluid to be contained in the measurement chamber;

wherein the measurement container includes at least one part this is configured to flex in response to an input force from a user to thereby deform the measurement container and release at least one of: a detent, a catch, a locking mechanism, or a seal that seals the measurement chamber.

17. An adjustable measured fluid dispenser for dispensing fluid from a storage chamber of a storage container, the fluid dispenser comprising:

a measurement chamber of a measurement container having a fillable volume; a divider configured to separate the measurement chamber from the storage chamber of the container;

at least one fluid flow passage extending through the divider and being configured to fluidly connect the measurement chamber with the storage chamber of the container;

at least one check valve configured to open the at least one fluid flow passage and permit fluid flow from the storage chamber to the measurement chamber, and configured to close the at least one fluid flow passage to prevent fluid flow between the measurement chamber and the storage chamber, the at least one check valve being configured to open at a predefined cracking pressure;

wherein the fillable volume of the measurement chamber is adjustable to adjust an amount of fluid to be contained in the measurement chamber;

wherein the measurement container includes at least one dividing wall that divides the measurement chamber into at least two measurement chamber regions having differently sized fillable volumes;

wherein the fillable volume is adjustable by selecting one of the at least two measurement chamber regions and arranging the selected chamber region relative to the divider such that an outlet of the at least one fluid flow passage opens into the selected chamber region.

18. A measured fluid dispenser for dispensing fluid from a storage chamber of a storage container, the fluid dispenser comprising:

a measurement chamber of a measurement container having a fillable volume; a cap operably couplable to the container, the cap at least partially forming a divider configured to separate the measurement chamber from the storage chamber of the container;

a first flow passage and a second flow passage, each extending through the divider and being configured to fluidly connect the measurement chamber with the storage chamber of the container;

a first check valve configured to open the first flow passage and permit liquid to flow in one direction from the storage chamber to the measurement chamber, and configured to close the first flow passage to prevent liquid flow between the measurement chamber and the storage chamber;

a second check valve configured to open the second flow passage and permit air to flow in one direction from the measurement chamber to the storage chamber, and configured to close the second flow passage to prevent fluid flow between the measurement chamber and the storage chamber;

wherein the first check valve is configured to open at a first predefined cracking pressure to permit liquid to flow through the first flow passage from the storage chamber of the container into the measurement chamber, and the second check valve is configured to open at a second predefined cracking pressure to permit air in the measurement chamber that is displaced by the liquid to escape from the measurement chamber into the storage chamber of the container; and wherein the second cracking pressure is lower than the first cracking pressure.

19. An adjustable measured fluid dispenser for dispensing fluid from a storage chamber of a storage container, the fluid dispenser comprising:

a measurement chamber of a measurement container having a fillable volume; a cap operably couplable to the container, the cap at least partially forming a divider configured to separate the measurement chamber from the storage chamber of the container, the measurement container being fluidly sealed to the cap with at least one seal;

at least one fluid flow passage extending through the divider and being configured to fluidly connect the measurement chamber with the storage chamber of the container; and at least one valve configured to open the at least one fluid flow passage and permit fluid flow from the storage chamber to the measurement chamber, and configured to close the at least one fluid flow passage to prevent fluid flow between the measurement chamber and the storage chamber;

the cap having one or more axially extending guide slots that slidably receive and guide corresponding one or more radially inwardly extending guide protrusions on an inner portion of the measurement container, such that the measurement container is slidably movable axially upwardly and downwardly relative to the cap to adjust the fillable volume of the measurement chamber, and one or more detents arranged at an interface between the cap and measurement container that are configured to indicate discrete graduated fillable volumes of the measurement chamber.

* * * * *